(12) United States Patent
Park et al.

(10) Patent No.: US 10,548,086 B2
(45) Date of Patent: Jan. 28, 2020

(54) METHOD FOR NEIGHBOR AWARE NETWORK ACCORDING TO PAGING SCHEME AND WIRELESS TERMINAL USING SAME

(71) Applicant: LG ELECTRONICS INC., Seoul (KR)

(72) Inventors: Giwon Park, Seoul (KR); Byungjoo Lee, Seoul (KR); Dongcheol Kim, Seoul (KR); Youngjun Jo, Seoul (KR); Taesung Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 15/769,046

(22) PCT Filed: Feb. 22, 2017

(86) PCT No.: PCT/KR2017/001945
§ 371 (c)(1),
(2) Date: Apr. 17, 2018

(87) PCT Pub. No.: WO2017/146461
PCT Pub. Date: Aug. 31, 2017

(65) Prior Publication Data
US 2019/0069242 A1    Feb. 28, 2019

Related U.S. Application Data

(60) Provisional application No. 62/299,559, filed on Feb. 25, 2016, provisional application No. 62/299,565, (Continued)

(51) Int. Cl.
*H04W 52/02* (2009.01)
*H04W 68/02* (2009.01)
(Continued)

(52) U.S. Cl.
CPC ....... *H04W 52/0248* (2013.01); *H04W 68/02* (2013.01); *H04W 72/1278* (2013.01);
(Continued)

(58) Field of Classification Search
None
See application file for complete search history.

(56) References Cited

U.S. PATENT DOCUMENTS

2014/0082185 A1* 3/2014 Abraham .............. H04W 24/00
                                                              709/224
2014/0269658 A1* 9/2014 Sadasivam ........ H04W 72/0406
                                                              370/338
(Continued)

FOREIGN PATENT DOCUMENTS

WO   2014/133832 A1   9/2014
WO   2015/069041 A1   5/2015

OTHER PUBLICATIONS

Daniel Camps-Mur et al., "Enabling Always on Service Discovery: WiFi Neighbor Awareness Networking", IEEE Wireless Communications, vol. 22, Apr. 29, 2015, See pp. 118-125; and figure 1.
(Continued)

*Primary Examiner* — Duc T Duong
(74) *Attorney, Agent, or Firm* — Dentons US LLP

(57) ABSTRACT

A method for a neighbor aware network (NAN) according to one embodiment of the present specification comprises the steps of: allowing a first terminal to exchange device capability information regarding a scheduling scheme for data communication with a second terminal in a search window; allowing the first terminal to maintain an awake state in a paging window to receive a paging message including identification information indicating a receiving terminal (recipient) for traffic to be received from the second terminal, when a paging scheme is selected by means of the scheduling scheme; and allowing the first terminal to ter-
(Continued)

minate, early, the paging window and switching from the awake state to a sleep state, when a channel evaluation indicator indicating a channel state of a wireless channel according to a signal received at a physical layer of the first terminal is idling for a predetermined threshold time.

10 Claims, 20 Drawing Sheets

Related U.S. Application Data filed on Feb. 25, 2016, provisional application No. 62/299,430, filed on Feb. 24, 2016.

(51) Int. Cl.
*H04W 74/08* (2009.01)
*H04W 84/18* (2009.01)
*H04W 72/12* (2009.01)
*H04W 88/02* (2009.01)
*H04W 92/18* (2009.01)

(52) U.S. Cl.
CPC ....... *H04W 74/0816* (2013.01); *H04W 84/18* (2013.01); *H04W 88/02* (2013.01); *H04W 92/18* (2013.01)

(56) References Cited

U.S. PATENT DOCUMENTS

| 2015/0109981 | A1* | 4/2015 | Patil .................... H04L 67/1078 370/311 |
| 2015/0365835 | A1 | 12/2015 | Segev et al. |
| 2016/0112986 | A1* | 4/2016 | Patil ..................... H04W 48/16 455/515 |
| 2016/0242056 | A1* | 8/2016 | Patil ..................... H04W 76/14 |
| 2016/0345295 | A1* | 11/2016 | Yang ..................... H04W 8/005 |
| 2016/0353253 | A1* | 12/2016 | Cherian ................ H04L 5/0055 |

OTHER PUBLICATIONS

"IEEE Standard for Information Technology, Telecommunications and information exchange between systems, Local and metropolitan area networks, Specific requirements, Part 11: Wireless LAN Medium Access Control (MAC) and Physical Layer (PHY) Specifications", IEEE Standards Activities Department, IEEE Draft P802.11-REVmb/D12.0, Nov. 2011, pp. i-2782.

"Draft Standard for Information Technology, Telecommunications and information exchange between systems Local and metropolitan area networks, Specific requirements, Part 11: Wireless LAN Medium Access Control (MAC) and Physical Layer (PHY) Specifications", IEEE Standards Activities Department, IEEE P802.11-REVmc/D4.1, Jul. 2015, pp. i-3676.

International Search Report from PCT/KR2017/001945, dated May 30, 2017.

* cited by examiner (A)

(B)

A method for neighbor aware
METHOD FOR NEIGHBOR AWARE NETWORK ACCORDING TO PAGING SCHEME AND WIRELESS TERMINAL USING SAME

CROSS-REFERENCE TO RELATED APPLICATIONS

This application is the National Stage filing under 35 U.S.C. 371 of International Application No. PCT/KR2017/001945, filed on Feb. 22, 2017, which claims the benefit of U.S. Provisional Applications No. 62/299,430 filed on Feb. 24, 2016, No. 62/299,559 filed on Feb. 25, 2016, and No. 62/299,565 filed on Feb. 25, 2016, the contents of which are all hereby incorporated by reference herein in their entirety.

BACKGROUND OF THE INVENTION

Field of the Invention

The present invention related to wireless communication and, most particularly, to a method for a neighbor aware network according to a paging scheme and a wireless terminal using the same.

Related Art

With the recent evolution in the information communication technology, diverse types of wireless communication technology are being developed. Most particularly, the wireless local area network (hereinafter referred to as 'WLAN') corresponds to a technology that allows wireless access to the Internet from general households, companies, or specific service providing areas by using a portable device based on a radio frequency technology.

For example, the portable device may correspond to a Personal Digital Assistant (PDA), a laptop computer, a Portable Multimedia Player (PMP), and so on. Generally, a device-to-device communication of a WLAN system is carried out by passing through a management entity, such as a base station or an access point (AP). The management entity performs scheduling for data communication.

In order to ensure flexibility in the device-to-device communication of the WLAN system, diverse protocols for performing device-to-device communication without passing through the management entity are being proposed. The NAN corresponds to a standard that is being established by the Wi-Fi Alliance (WFA) based on the Wi-Fi standard. The NAN standard regulates synchronization and discovery (or search) processes between the devices in a 2.5 GHz or 5 GHz frequency band.

SUMMARY OF THE INVENTION

Technical Objects

An object of this specification is to provide a method for a neighbor aware network according to a paging scheme having reduced standby power consumption and a wireless terminal using the same.

Technical Solutions

This specification relates to a method for a neighbor aware network (NAN). The method for a neighbor aware network (NAN) according to an exemplary embodiment of this specification may include the steps of exchanging, by a first device, device capability information related to a scheduling scheme for data communication with a second device in a Discovery Window, when a paging scheme is selected as the scheduling scheme, maintaining, by the first device, an awake state in a Paging Window in order to receive a paging message including identification information indicating a recipient (or receiving device) for a traffic that is to be received from a second device, and, when a channel assessment indicator indicating a channel state of a radio channel in accordance with a signal being received in a physical layer of the first device is idle during a predetermined time limit, carrying out, by the first device, an early termination of the paging window and shifting from the awake state to a sleep state.

Effects of the Invention

According to an exemplary embodiment of this specification, provided herein are a method for a neighbor aware network according to a paging scheme having reduced standby power consumption and a wireless terminal using the same.

DESCRIPTION OF EXEMPLARY EMBODIMENTS

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

Figure 1:
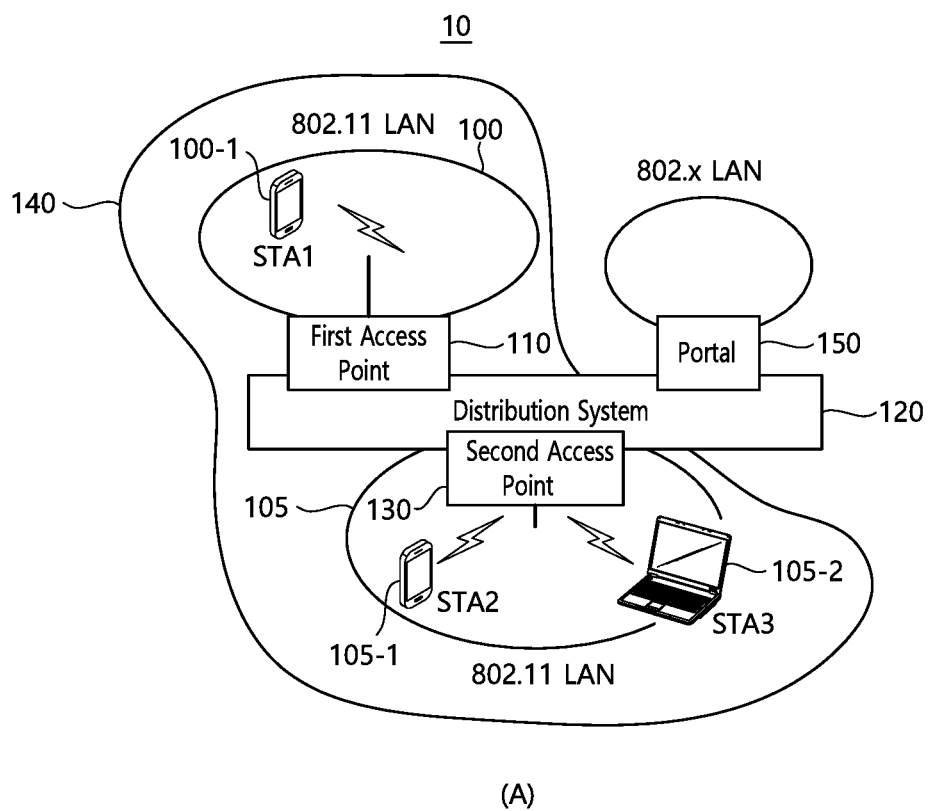
FIG. 1 is a conceptual view illustrating the structure of a wireless local area network.
Figure 1:
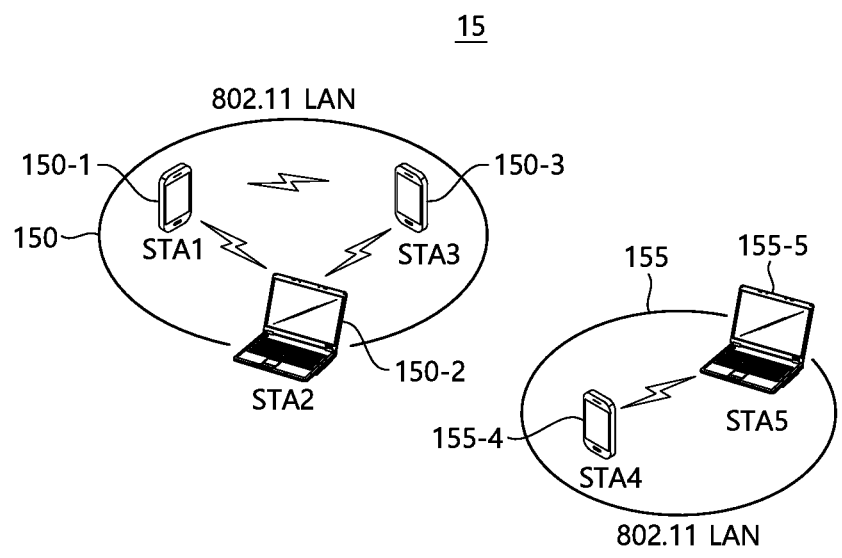

FIG. 1 is a conceptual view illustrating the structure of a wireless local area network. FIG. 1A illustrates the structure of an infrastructure basic service set (BSS) of institute of electrical and electronic engineers (IEEE) 802.11.

Referring the FIG. 1A, the WLAN system 10 of the FIG. 1A may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be related with one AP 110. The BSS 105 may include one or more STAs 105-1 and 105-2 which may be related with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1A, a network between the APs 110 and 130 and a network between the APs 110 and 130 and the STAs 100-1, 105-1, and 105-2 may be implemented.

FIG. 1B illustrates a conceptual view illustrating the IBSS. Referring to FIG. 1B, a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1B, the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner.

In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
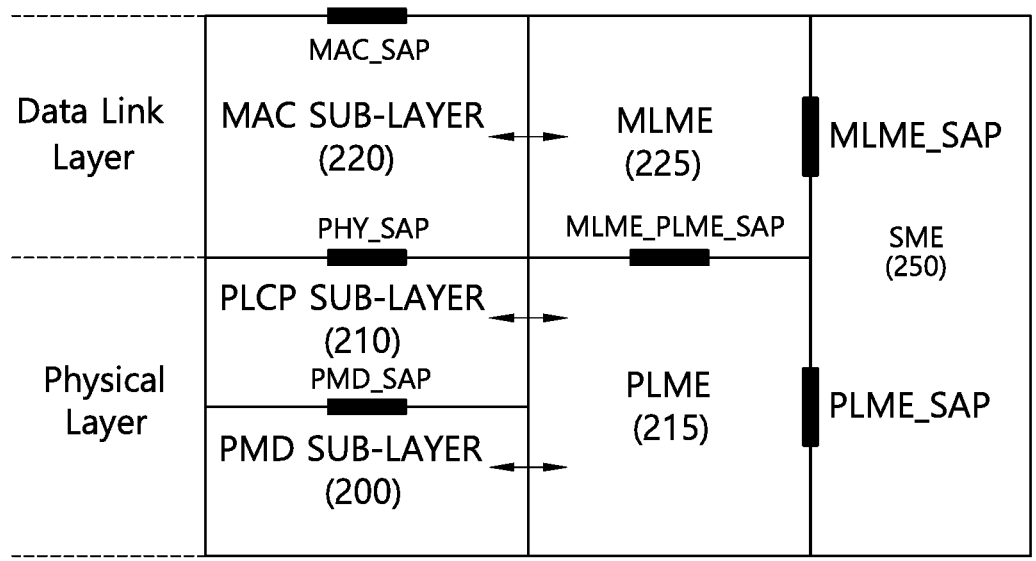
FIG. 2 is a conceptual view illustrating a layered architecture of a WLAN system supported by IEEE 802.11.

FIG. 2 is a conceptual view illustrating a layered architecture of a WLAN system supported by IEEE 802.11. Referring to FIG. 2, the layered architecture of the WLAN system may include a physical medium dependent (PMD) sub-layer 200, a physical layer convergence procedure (PLCP) sub-layer 210, and a medium access control (MAC) sub-layer 220.

The PLCP sub-layer 200 may serve as a transmission interface for transmitting/receiving data between a plurality of STAs. The PLCP sub-layer 210 is implemented such that the MAC sub-layer 220 is operated with a minimum dependency with respect to the PMD sub-layer 200.

The PMD sub-layer 200, the PLCP sub-layer 210, and the MAC sub-layer 220 may conceptually include respective management entities. For example, the management entity of the MAC sub-layer 220 is referred to as a MAC layer management entity (MLME) 225. The management entity of the physical layer is referred to as a PHY layer management entity (PLME) 215.

The management entities may provide an interface for performing a layer management operation. For example, the PLME 215 may be connected to the MLME 225 to perform a management operation of the PLCP sub-layer 210 and the PMD sub-layer 200. The MLME 225 may be connected to the PLME 215 to perform a management operation of the MAC sub-layer 220.

An STA management entity (SME) 250 may exist to perform a proper MAC layer operation. The SME 250 may be operated as a constitutional element independent of each layer. The PLME 215, the MLME 225, and the SME 250 may mutually transmit and receive information on the basis of a primitive.

The operation of each sub-layer is briefly described as follows. For example, the PLCP sub-layer 210 delivers a MAC protocol data unit (MPDU) received from the MAC sub-layer 220 according to an instruction of the MAC layer between the MAC sub-layer 220 and the PMD sub-layer 200 to the PMD sub-layer 200 or delivers a frame from the PMD sub-layer 200 to the MAC sub-layer 220.

The PMD sub-layer 200 is a PLCP sub-layer and may transmit and receive data between a plurality of STAs through a wireless medium. The MPDU delivered from the MAC sub-layer 220 is referred to as a physical service data unit (PSDU) in the PLCP sub-layer 210. Although the MPDU is similar to the PSDU, if an aggregated MPDU (AMPDU) obtained by aggregating a plurality of MPDUs is delivered, the MPDUs may be individually different from the PSDUs.

The PLCP sub-layer 210 adds an additional field including information required by a transceiver of a physical layer in a process of receiving the PSDU from the MAC sub-layer 220 and delivering it to the PMD sub-layer 200. In this case, the field added to the PSDU may be a PLCP preamble, a PLCP header, and tail bits required to return a convolution encoder to a zero state.

The PLCP sub-layer 210 adds the aforementioned fields to the PSDU to generate a PLCP protocol data unit (PPDU) and transmits the PPDU to a receiving station through the PMD sub-layer 200. The receiving station receives the PPDU to perform restoration by obtaining information required to restore data from the PLCP preamble and the PLCP header.

Figure 3:
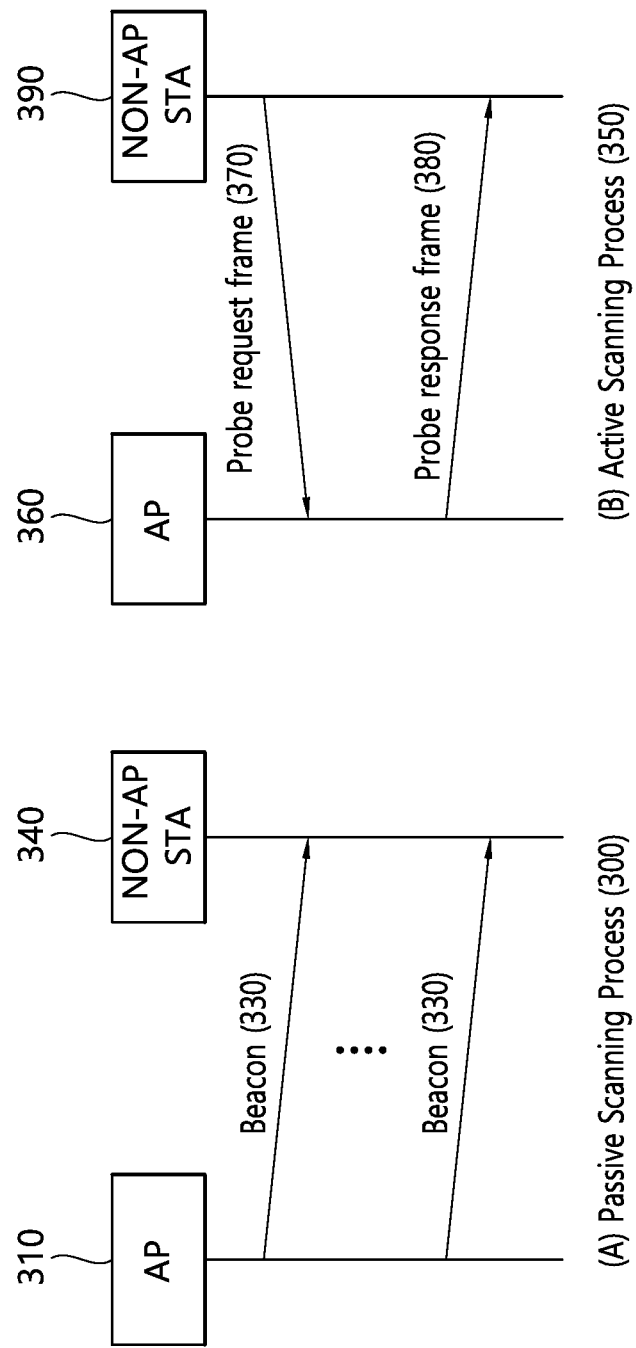
FIG. 3 is a concept view illustrating a scanning method in a WLAN.

FIG. 3 is a concept view illustrating a scanning method in a WLAN.

Referring to FIG. 3, the scanning method may be divided into passive scanning 300 and active scanning 350.

Referring to FIG. 3A, the passive scanning 300 may be performed by a beacon frame 330 that is periodically broadcast from the AP 300. The AP 300 in the WLAN broadcasts the beacon frame 330 to the non-AP STA 340 at a particular period (e.g., per 100 msec).

The beacon frame 330 may contain information on the current network. The non-AP STA 340 may perform scanning on the channel and the AP 310 to perform the authentication/association process based on the network information included in the beacon frame 330 periodically broadcast.

The passive scanning method 300 is a technique that the non-AP STA 340 receives a beacon frame 330 transmitted from the AP 310 without first transmitting a frame. Accordingly, the passive scanning 300 has an advantage of a reduction in the overall overhead that is created upon data transmission/reception over the network. However, since the scanning is obliged to be passively performed in proportion to the period of the beacon frame 330, the time taken to perform scanning may be increased.

Detailed description of the beacon frame is disclosed in Section 8.3.3.2 of IEEE Draft P802.11-REVmc™/D4.1, July 2015 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which is disclosed in July, 2015.

Referring to FIG. 3B, the active scanning 350 is a technique in which the non-AP STA 390 leads scanning by transmitting a probe request frame 370 to the AP 360.

The AP 360 may receive the probe request frame 370 from the non-AP STA 390. The AP 360 may wait a random time to prevent frame collision. The AP 360 may transmit a frame response frame 380 including network information to the non-AP STA 390 in response to a probe request frame 370. The non-AP STA 390 may obtain the network information based on the received probe response frame 380.

The active scanning 350 allows the non-AP STA 390 to lead the scanning process, and the active scanning 350 has the advantage of a short scanning time. However, the non-AP STA 390 should transmit the probe request frame 370, resulting in an increase in the network overhead for frame transmission and reception.

The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
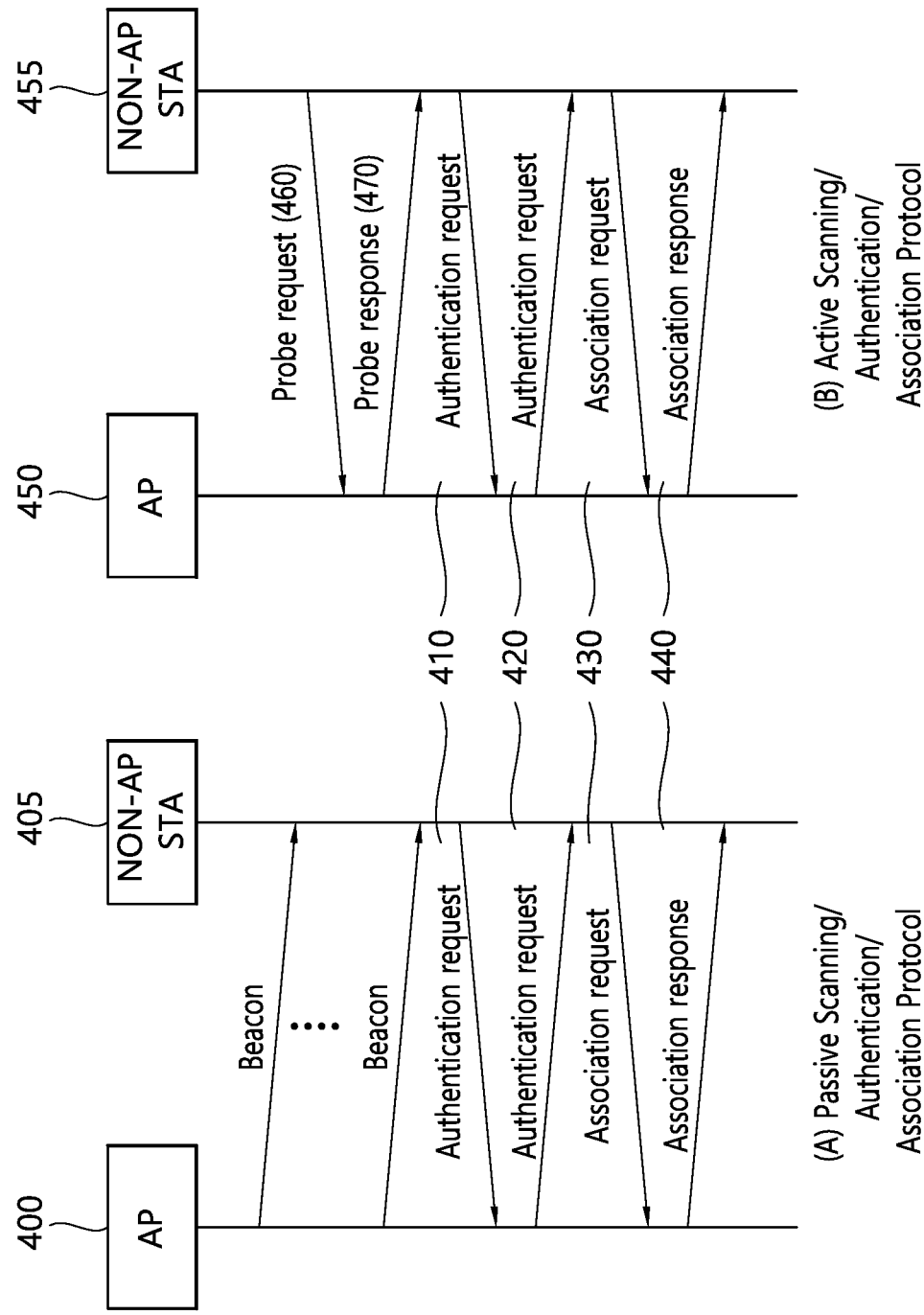
FIG. 4 is a conceptual diagram illustrating authentication and association processes after the scanning of an AP and an STA.

FIG. 4 is a conceptual diagram illustrating authentication and association processes after the scanning of an AP and an STA.

Referring to FIG. 3 and FIG. 4, a non-AP STA may perform authentication and association processes with one AP, among a plurality of APs that have completed the scanning process through passive/active scanning. For example, the authentication and association processes may be performed through 2-way handshaking.

(A) of FIG. 4 is a conceptual diagram showing the authentication and association processes after passive scanning, and (B) of FIG. 4 is a conceptual diagram showing the authentication and association processes after active scanning.

The authentication and association processes may be performed regardless of whether the active scanning method or the passive scanning method has been performed. For example, by having the AP 400 and 450 exchange an authentication request frame 410, an authentication response frame 420, an association request frame 430, and an association response frame 440 with the non-AP STA 405 and 455, the authentication and association processes may be performed.

More specifically, the authentication process may be performed by having the non-AP STA 405 and 455 transmit an authentication request frame 410 to the AP 400 and 450. The AP 400 and 450 may transmit an authentication response frame 420 to the non-AP STA 405 and 455 as a response to the received authentication request frame 410. A detailed description of an authentication frame format is disclosed in Section 8.3.3.11 of IEEE 802.11.

More specifically, the association process may be performed by having the non-AP STA 405 and 455 transmit an association request frame 430 to the AP 400 and 450. And, the AP 400 and 450 may transmit an association response frame 440 to the non-AP STA 405 and 455 as a response to the received association request frame 430.

The association request frame 430 may include information on the capability of the non-AP STA 405 and 455. The AP 400 and 450 may determine whether or not support is available for the non-AP STA 405 and 455 based on the information on the capability of the non-AP STA 405 and 455, which is included in the association request frame 430.

For example, in case the support for the non-AP STA 405 and 455 is available, the AP 400 and 450 may load information on whether or not the association request frame 430 is accepted and the corresponding reason, and the capability information it is capable of supporting to the association response frame 440 and may transmit the association response frame 440 to the non-AP STA 405 and 455. Detailed description on an association frame format is disclosed in Section 8.3.3.5/8.3.3.6 of IEEE 802.11.

Once the association process, which is described in FIG. 4, is performed, normal data transmission and reception processes may be performed between the AP and the STA.

Figure 5:
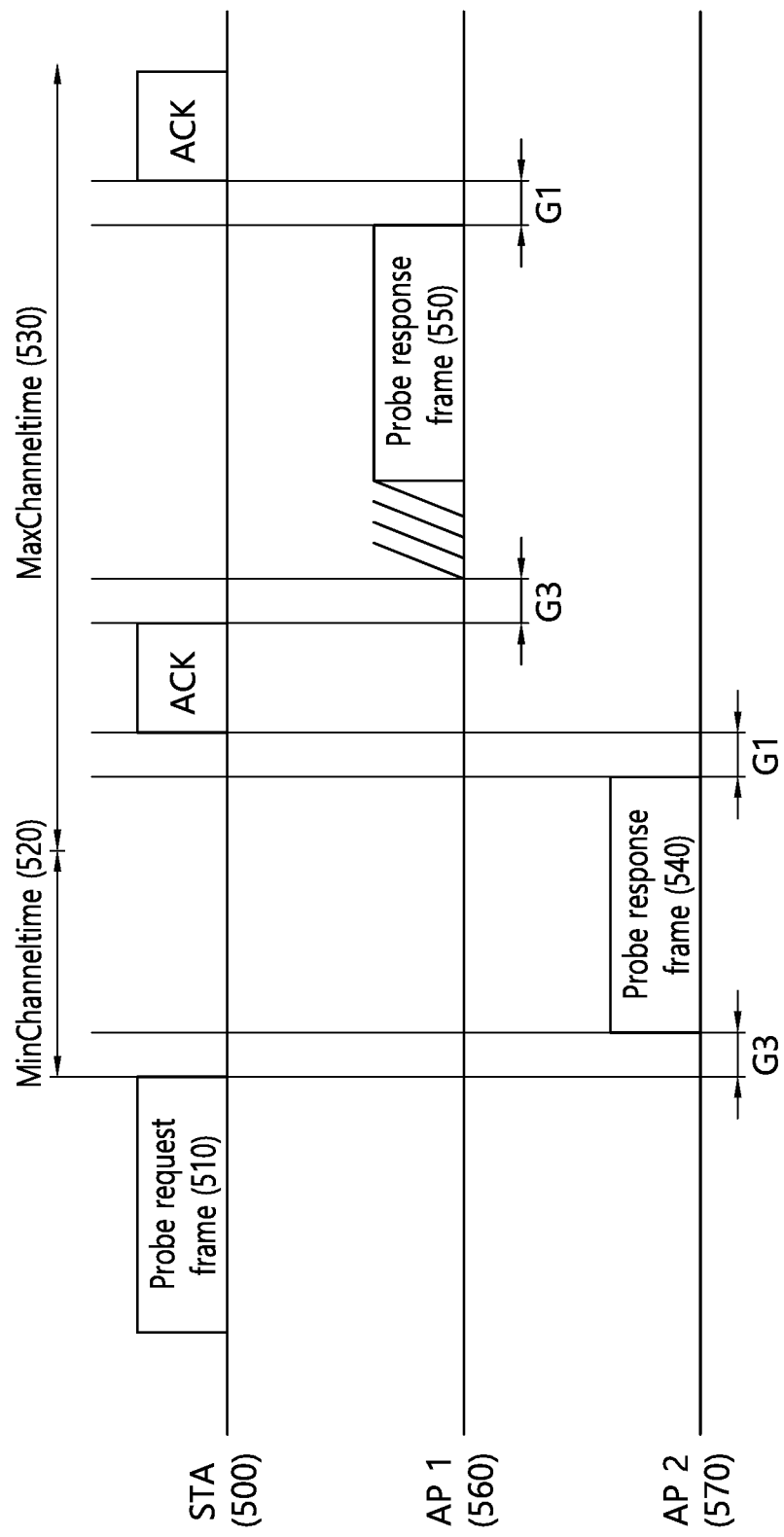
FIG. 5 is a concept view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning PHY-RXSTART.indication primitive is a signal that is transmitted from the physical (PHY) layer to the local medium access control (MAC) layer. PHY-RXSTART.indication primitive may signal information indicating that the physical layer convergence protocol (PLCP) has received a PLCP protocol data unit (PPDU) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, service set identification (SSID) and basic service set identification (BSSID) information) may be included in the probe request frame 510 and may be transmitted.

The BSSID may have a value corresponding to the MAC address of the AP as an indicator to specify the AP. The service set identification (SSID) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime) 520 and a maximum channel time (MaxChanneltime) 530. The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 550 and 550 until the probe timer reaches the minimum channel time 520, the STA 500 shifts scanning channels to perform scanning on other channels. In case the STA 500 receives the probe response frame 550 until the probe timer reaches the minimum channel time 520, it may process the received probe response frames 540 and 550 after waiting until the probe timer reaches the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set a net allocation vector (NAV) to 0, and the STA 500 may scan a next channel. In case PHY-CCA.indication is detected to be busy, the STA 500 may perform a process on the received probe response frames 550 and 550 after the probe timer reaches the maximum channel time 530. After the process on the received probe response frames 550 and 550 is done, the STA 500 may set the net allocation vector (NAV) to 0 and may then scan a next channel.

Hereinafter, in embodiments of the present invention, determining whether there are probe response frames 550 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is another BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

Figure 6:
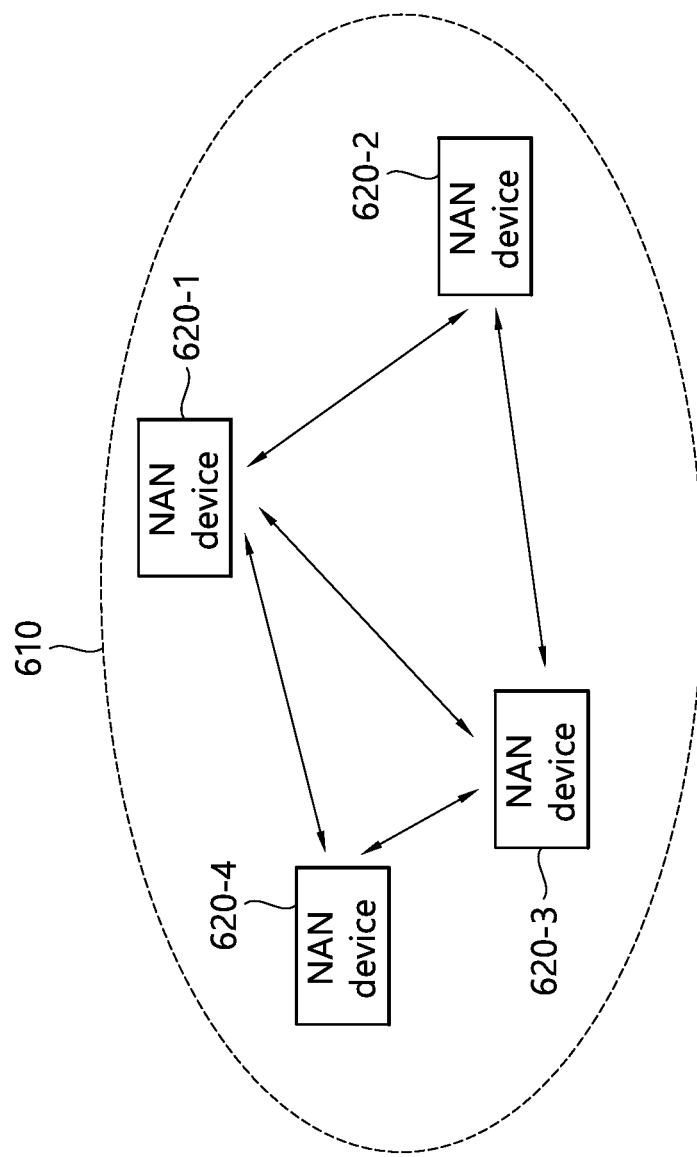
FIG. 6 and FIG. 7 are diagrams showing NAN clusters.
Figure 7:
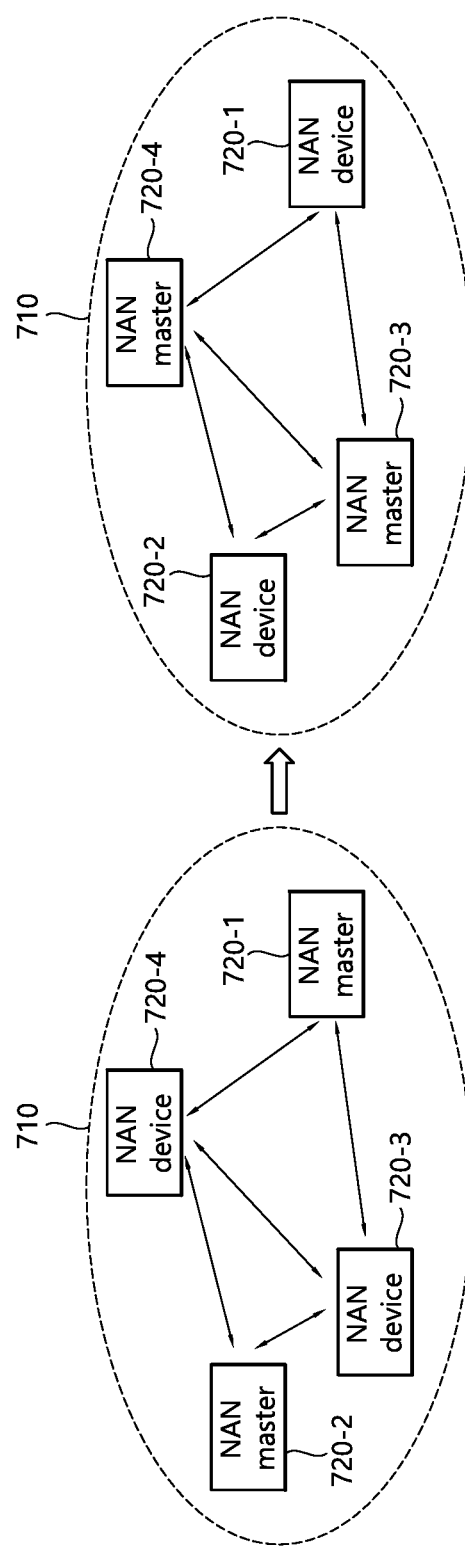

FIG. 6 and FIG. 7 are diagrams showing NAN clusters. A NAN cluster may be configured of a plurality of NAN devices using the same set of NAN parameters. For example, the NAN parameter may include section information between consecutive discovery windows (hereinafter referred to as 'DW'), information on a beacon interval, or information on a NAN channel.

Referring to FIG. 6, a NAN cluster 610 may include a plurality of NAN devices 620_1, 620_2, 620_3, and 620_4. The NAN cluster uses the same set of NAN parameters. The NAN cluster 610 may correspond to a set of a plurality of NAN devices 620_1, 620_2, 620_3, and 620_4 being synchronized to the same discovery window (DW).

Any one NAN device, among the NAN devices 620_1, 620_2, 620_3, and 620_4 of the NAN cluster 610, may directly transmit a NAN service discovery frame (hereinafter referred to as 'SDF') of a multicast method or a unicast method to another NAN device within a range of the discovery window (DW).

Referring to FIG. 7, a NAN cluster 710 may include at least one NAN master 720_1 and 720_2. At least one NAN master 720_1 and 720_2 included in the same NAN cluster 710 may be changed to at least one other NAN device 720_3 and 720_4 after being processed within a series of processes.

The at least one NAN master may transmit all of a synchronization beacon frame (SBF), a discovery beacon frame (DBF), and a NAN service discovery frame (SDF). The synchronization beacon frame (SBF), the discovery beacon frame (DBF), and the NAN service discovery frame (SDF) will be described in more detail later on with reference to the accompanying drawings.

Figure 8:
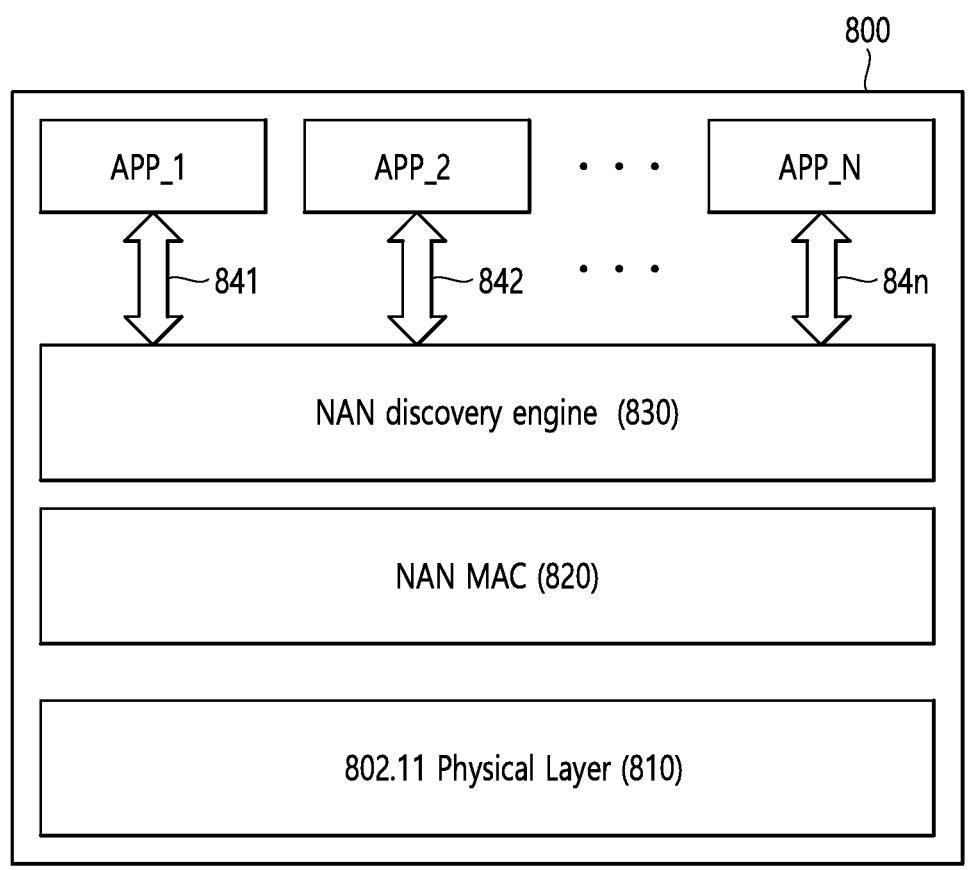
FIG. 8 is a block diagram related to a structure of a NAN device.

FIG. 8 is a block diagram related to a structure of a NAN device. Referring to FIG. 8, the NAN device 800 may be operated based on a physical layer 810 of 802.11. The NAN device 800 may include a NAN Medium Access Control (MAC) 820, a NAN discovery engine 830, a plurality of applications App_1, App_2, . . . , and App_n, and a plurality of NAN application programming interfaces (NAN APIs) 841, 842, . . . , and 84n being connected to each of the plurality of applications App_1, App_2, . . . , and App_n as its main components.

For the discovery operation of the NAN device and its data communication with its counterpart NAN device, a NAN discovery engine 830 may control the operations of a NAN MAC 820 based on a primitive, which is received from the plurality of applications App_1, App_2, . . . , and App_n of the NAN device. Additionally, the NAN discovery engine 830 may provide an overall operation for a discovery operation for discovering other devices within the NAN cluster, a further discovery operation for completing the discovery operation, and a scheduling operation for the data communication with other devices within the NAN cluster.

Figure 9:
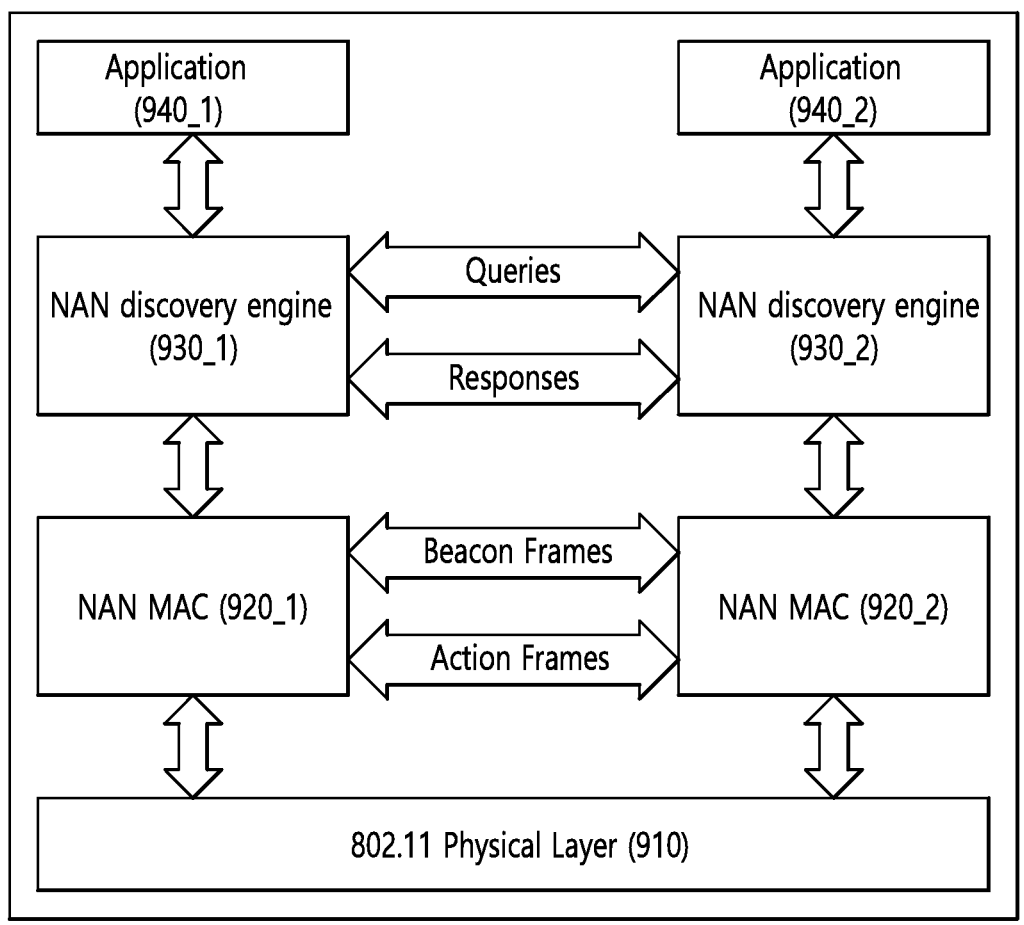
FIG. 9 is a diagram showing a relationship between NAN components.

FIG. 9 is a diagram showing a relationship between NAN components. Referring to FIG. 9, a NAN MAC 920_1 and 920_2 is related to a physical layer 910 and may process a NAN beacon frame and a NAN service discovery frame.

The NAN engine 930_1 and 930_2 may process service Queries (or requests) and Responses. Also, the NAN engine 930_1 and 930_2 may provide an overall function for scheduling a synchronization scheme of a neighbor aware network (NAN) according to an exemplary embodiment of the present invention.

Figure 10:
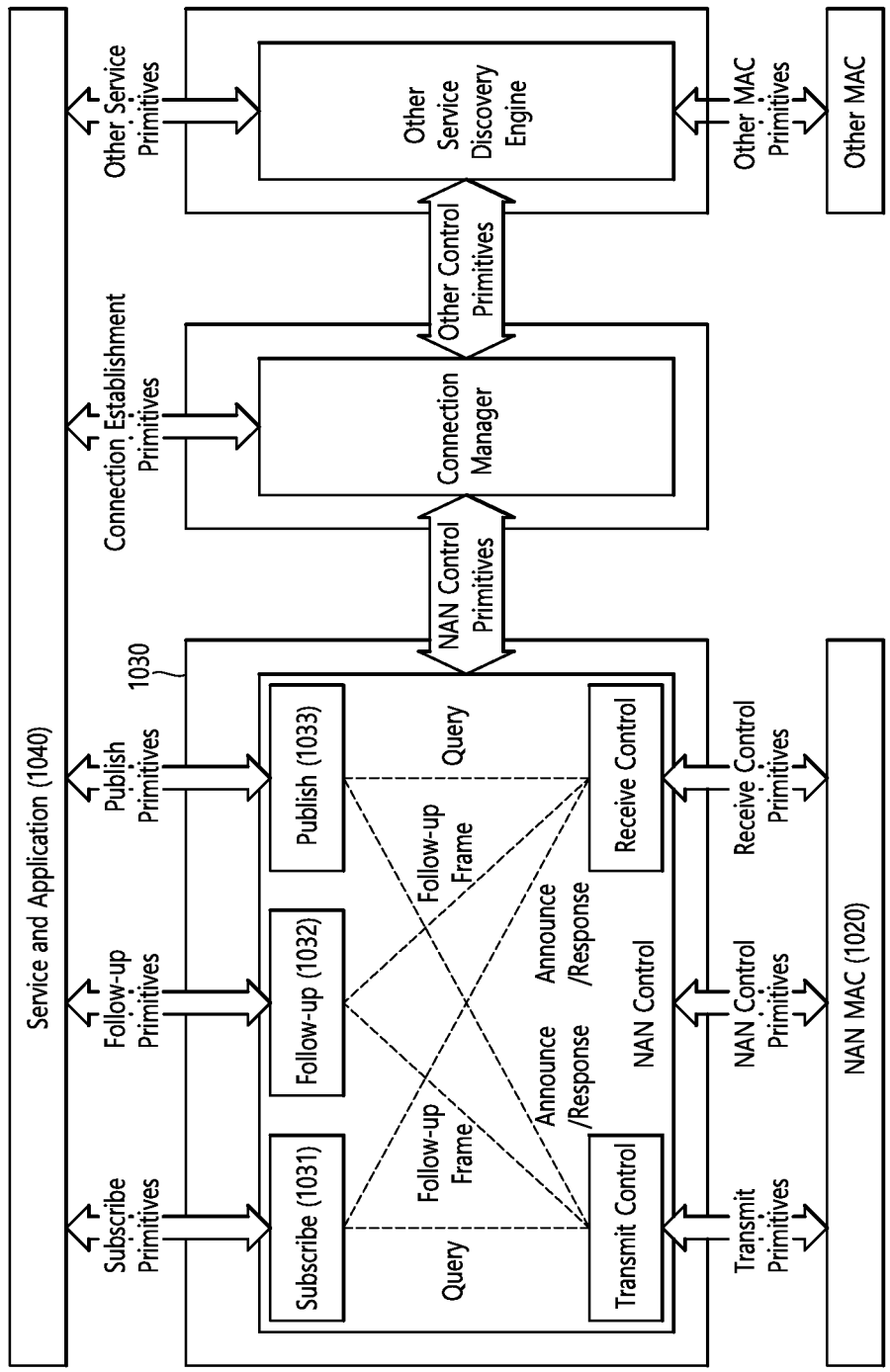
FIG. 10 is a diagram showing a relationship between NAN components.

FIG. 10 is a diagram showing a relationship between NAN components. Referring to FIG. 10, a NAN MAC 1020 may process a NAN beacon frame and a NAN service discovery frame. A NAN discovery engine 1030 may process service Queries (or requests) and Responses.

The NAN discovery engine 1030 may provide functions of Subscribe 1031, Follow-up 1032, and Publish 1033. Additionally, the NAN discovery engine 1030 may provide an overall function for a further discovery operation.

The Subscribe 1031/Publish 1033 functions operate based on a service interface, which is provided by a service/application 1040. When commands (or instructions) of Subscribe 1031/Publish 1033 are executed, instances of the Subscribe 1031/Publish 1033 functions are generated.

Each instance is driven independently, and, depending upon the implementation, multiple instances may be driven at the same time. The Follow-up 1032 function may transmit/receive service-specific information for the service/application 1040.

Figure 11:
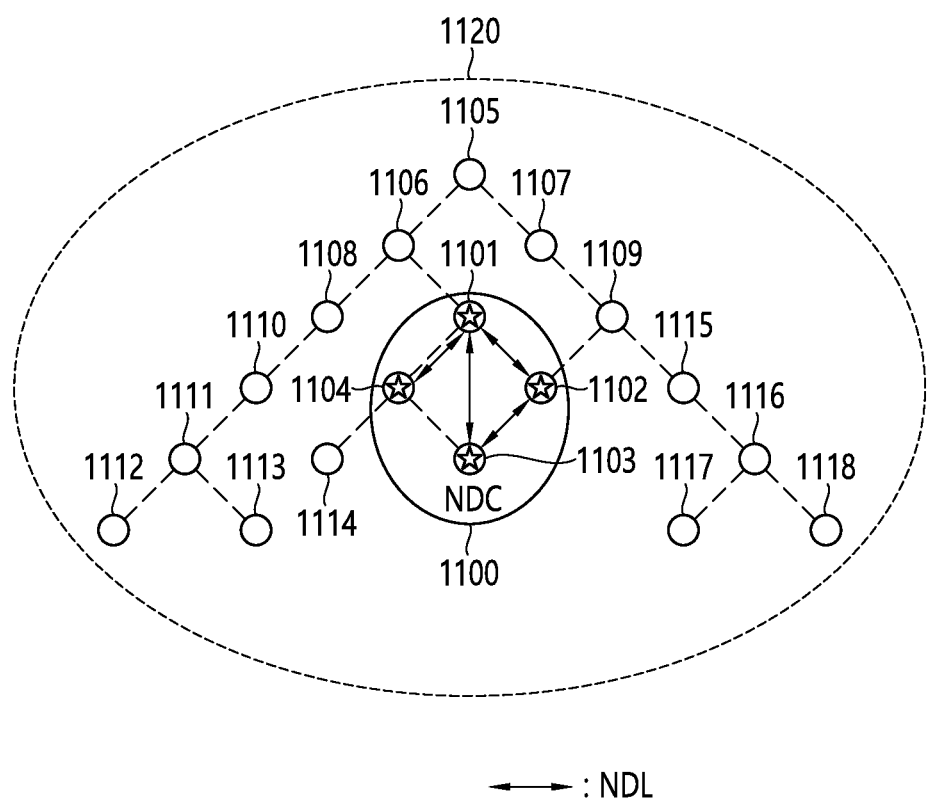
FIG. 11 illustrates a NAN data communication structure for performing data transmission/reception between the NAN devices.

FIG. 11 illustrates a NAN data communication structure for performing data transmission/reception between the NAN devices. Referring to FIG. 1 to FIG. 11, a NAN Data Cluster (hereinafter referred to as 'NDC') 1100 may include at least two or more NAN devices 1101, 1102, 1103, and 1104 within the same NAN cluster 1120 shown in FIG. 11.

Each NAN device existing in the NDC 1100 has at least one NAN data link (hereinafter referred to as 'NDL'). In this case, the NDL may refer to a common resource block (hereinafter referred to as 'CRB') between the NAN devices. In order to share a resource block (CRB) for performing data transmission/reception, the NAN device may establish an NDL with another NAN device. Each NDL may have its own NDL schedule.

A NAN Data Path (hereinafter referred to as 'NDP') may refer to a data connection, which is established for a service between NAN devices. An NDP may be set up (or configured) in order to request a service between NAN devices.

For example, a first NAN device 1101 has an NDL with a second NAN device to a fourth NAN device 1102, 1103, and 1104. The second NAN device 1102 has an NDL with the first NAN device 1101 and the third NAN device 1103. The third NAN device 1103 has an NDL with the first NAN device 1101 and the second NAN device 1102. And, the fourth NAN device 1104 has an NDL with the first NAN device 1101.

Although the remaining NAN devices 1105~1118 within the NAN cluster 1120, excluding the NAN devices 1101, 1102, 1103, and 1104 being included in the NDC 1100, are capable of transmitting/receiving control information related to the NAN parameters, the corresponding NAN devices 1105~1118 are incapable of transmitting/receiving actual data, such as a payload.

Figure 12:
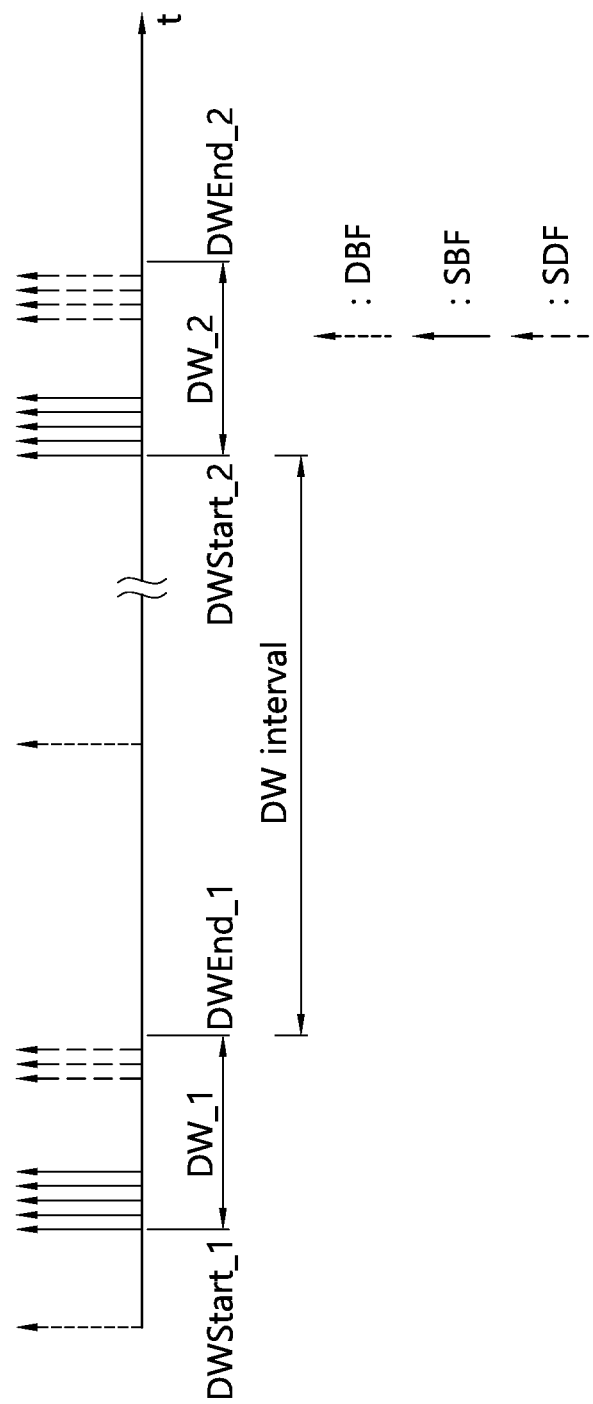
FIG. 12 illustrates operations of a NAN device during a discovery window and a discovery window interval.

FIG. 12 illustrates operations of a NAN device during a discovery window and a discovery window interval.

Referring to FIG. 12, a discovery window (DW) may indicate a time point and channel where the NAN devices within the NAN cluster converge. A horizontal axis of FIG. 12 represents a time axis (t), and a unit of the time axis corresponds to a time unit (TU). Although a vertical axis of FIG. 12 is not separately indicated, it will be understood that the vertical axis indicates the presence or absence of a frame that is transmitted by the NAN devices included in the NAN cluster.

Additionally, it will be understood that the synchronization beacon frame (SBF), the discovery beacon frame (DBF), and the service discovery frame (SDF), which are transmitted by the NAN device of FIG. 12, may be transmitted through the same channel or may each be transmitted through a different channel.

Referring to FIG. 12, a section starting from a start time point (DWStart_1) to an end time point (DWEnd_1) of a first time window (DW_1) may correspond to 16 TUs, and a discovery window interval (DW interval) indicating an interval starting from an end time point (DWEnd_1) of the first time window (DW_1) to a start time point (DWStart_2) of a second time window (DW_2) of the next cycle may correspond to 496 TUs.

Similarly, a section starting from a start time point (DWStart_2) to an end time point (DWEnd_2) of the second time window (DW_2) may correspond to 16 TUs.

A synchronization beacon frame (hereinafter referred to as 'SBF') is used for the synchronization of multiple NAN devices within a NAN cluster. A discovery beacon frame (hereinafter referred to as 'DBF') is used to perform an advertisement to a NAN device, which is not subscribed to the NAN cluster, so that the corresponding NAN cluster can be discovered. A service discovery frame (hereinafter referred to as 'SDF') is used for exchanging usable services between NAN devices.

By having at least one NAN device transmit a synchronization beacon frame (SBF) during a discovery window, all of the NAN devices included in the NAN cluster may be synchronized. One NAN device may transmit one synchronization beacon frame (SBF) during one discovery window (DW).

At least one NAN device may transmit at least one discovery beacon frame (DBF) in a discovery window interval (DW_interval). Accordingly, this is to allow NAN devices belonging to another NAN cluster to discover the NAN cluster to which the at least one NAN device that has transmitted the discovery beacon frame (DBF) belongs. Additionally, this is to allow NAN devices that do not belong to the Nan cluster to discover the NAN cluster to which the at least one NAN device that has transmitted the discovery beacon frame (DBF) belongs.

The NAN device may transmit a service discovery frame (SDF) based on a contention during a discovery window (DW). The NAN device initiates (or starts) a backoff timer, which is set to a random value, and, if the value of the backoff time reaches 0, the service discovery frame (SDF) may be transmitted.

The service discovery frame (SDF) may include any one of two different types of NAN Service discovery protocol messages.

For example, the NAN Service discovery protocol message may correspond to a subscribe message for actively verifying the availability for usage of a specific service. Alternatively, the NAN Service discovery protocol message may correspond to a publish message that is transmitted when response criteria of NAN devices having received the subscribe message are satisfied.

However, the publish message may be transmitted so as to allow other NAN devices to discover an available service of the NAN devices transmitting the publish message.

Hereinafter, for simplicity in the description, a service discovery frame (SDF) including a subscribe message will be referred to as a subscribe frame, and a service discovery frame (SDF) including a publish message will be referred to as a publish frame.

Detailed description of the subscribe message, which is mentioned in this specification, is provided in Section 4.1.1.1.1 and Section 4.1.3 of Version 1.0 r22 of Wi-Fi Neighbor Awareness Networking (hereinafter referred to as 'NAN') Technical Specification.

Figure 13:
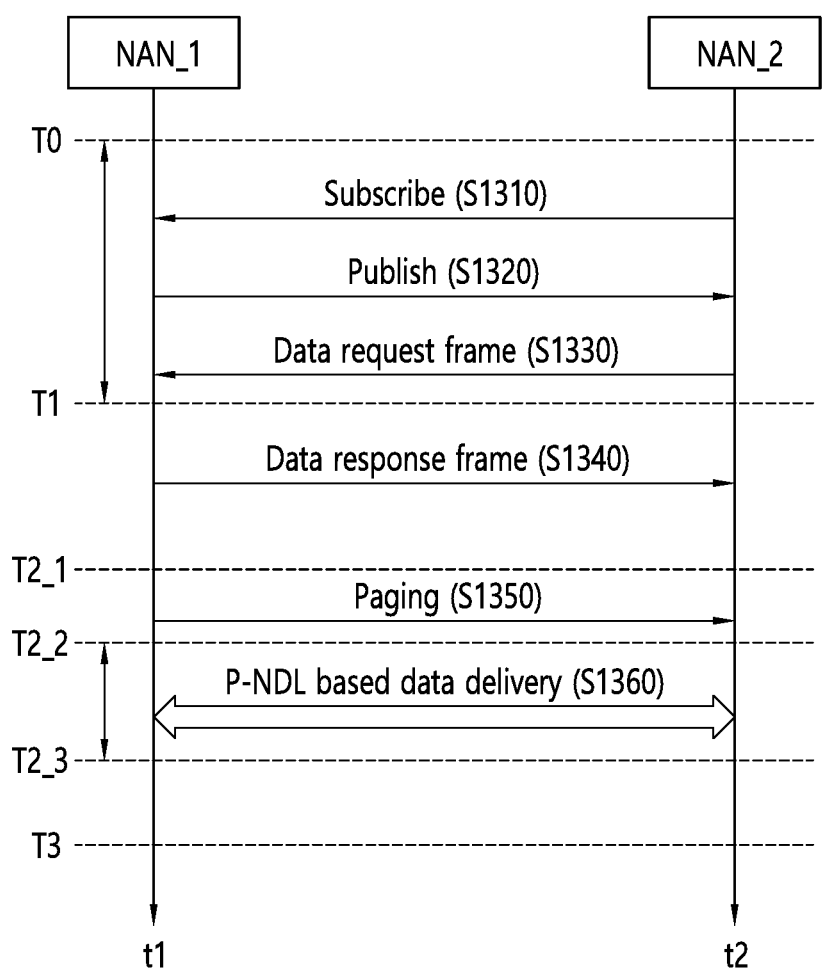
FIG. 13 illustrates a paging NDL scheme of a NDL scheduling scheme of a NAN device according to an exemplary embodiment of the present invention.

FIG. 13 illustrates a paging NDL (hereinafter referred to as 'P-NDL') scheme of a NDL scheduling scheme of a NAN device according to an exemplary embodiment of the present invention.

Referring to FIG. 12 and FIG. 13, a first section (T0~T1) of FIG. 13 may correspond to a first discovery window (DW_1) or a second discovery window (DW_2) of FIG. 12, and a second section (T1~T3) of FIG. 13 may correspond to a discovery window interval (DW interval) of FIG. 12.

In step S1310, a subscriber device (NAN_2) may transmit a subscribe frame to a publisher device (NAN_1). The subscribe frame may include information on a service and a scheduling scheme that are available for support to the subscriber device (NAN_2).

In step S1320, the publisher device (NAN_1) may transmit a publish frame to the subscriber device (NAN_2). The publish frame may include information on a service and a scheduling scheme that are available for support to the may include information on a service and a scheduling scheme that are available for support to the publisher device (NAN_1).

Through step S1310 and step S1320, the publisher device (NAN_1) may recognize (or may be aware of) an available service of the subscriber device (NAN_2) and an available scheduling scheme of NAN_2. The subscriber device (NAN_2) may recognize (or may be aware of) an available service and an available scheduling scheme of the publisher device (NAN_1).

More specifically, according to step S1310 and step S1320, the device capability of the publisher device (NAN_1) and the subscriber device (NAN_2) may be exchanged between one another.

In step S1330, in order to request data that are to be transmitted to the subscriber device (NAN_2), the subscriber device (NAN_2) may transmit a data request frame to the publisher device (NAN_1). In step S1340, as a response to the data request frame the publisher device (NAN_1) may transmit a data response frame to the subscriber device (NAN_2).

After performing step S1330 and step S1340, the publisher device (NAN_1) and the subscriber device (NAN_2) may negotiate common resource block (CRB) capable of performing data transmission/reception between one another. Although it is shown in FIG. 13 that the data request frame is transmitted within the first section (T0~T1), the present invention will not be limited only to this.

The common resource block (CRB) (T2_1~T2_3) of the paging scheme shown in FIG. 13 may include a first paging window (PW) (T2_1~T2_2) for transmitting a paging frame, and a first transmission window (TxW) (T2_2~T2_3) for performing data transmission. The publisher device (NAN_1) and the subscriber device (NAN_2) may enter a common resource block (T2_1~T2_3) at the same timing (T2_1).

In S1350, in case a predetermined offset time (T1~T2_1) is elapsed since at end time point (T1) of the discovery window (DW), the first paging window (T2_1~T2_2) may be initiated. During the first paging window (PW), the publisher device (NAN_1) may transmit a paging frame to the subscriber device (NAN_2).

More specifically, during the first paging window (T2_1~T2_2) of FIG. 13, the publisher device (NAN_1) having the data may transmit a paging frame including list information on destinations of buffered data.

For example, the list information may correspond to a Medium Access Control (MAC) address of a NAN device that is to receive the buffered data.

The paging frame of step S1350 may be transmitted to a plurality of subscriber devices. Each subscriber device may determine whether or not it has received the data based on the list information included in the paging frame, which is received from the publisher device (NAN_1).

Although it is not shown in FIG. 13, in case a device (or terminal) determines that it has received the data in accordance with the paging frame, the subscriber device may transmit a trigger frame to the publisher device.

The subscriber device may notify the publisher device that it maintains its awake state in order to receive the buffered data by using the trigger frame. For example, the trigger frame may correspond to a Quality of Service (QoS) null frame that is irrelevant to the payload.

For simplicity in the description of FIG. 13, it will hereinafter be assumed that the subscriber device (NAN_2) determines itself as a device receiving data according to the list information included in the paging frame. In this case, the subscriber device (NAN_2) may maintain its awake state during the paging window (PW) (T2_1~T2_2) and the transmission window (TxW) (T2_2~T2_3).

A page attribute, which is mentioned in this specification, may include list information on the destinations of the buffered data. In this specification, the subscriber device being included in the list information may be referred to as a recipient (or a receiving device).

The paging frame including the paging attribute may be transmitted between the NAN devices in the paging window (PW). An exemplary format of the paging attribute may be as shown below in Table 1.

TABLE 1

| Field | Size (Octets) | Description |
| --- | --- | --- |
| Attribute ID | 1 | Identifies the type of NAN attribute |
| Length | 2 | Length of the following fields in the attribute. |
| NDL Group ID | 6 | Data Link Group Identifier |
| Page Control | 1 | Indicates which fields are Present |
| Sequence of PDLs | Variable | One or more Paged Device Lists |

Referring to FIG. 1, the page attribute may include an Attribute ID field for identifying a type of the NAN attribute, a Length field indicating a length of the attribute, an NDL Group ID field for a data link group identifier, a Page Control field indicating the current field, and a Sequence of PDLs field being associated with list information (corresponding to the above-described list of destinations of the buffered data) of one or more NAN devices that is/are to receive data being buffered to the publisher device.

In step S1360, the subscriber device (NAN_2), which has received the paging frame, may perform communication with the publisher device (NAN_1) during the transmission window (TxW) (T2_2~T2_3). More specifically, the subscriber device (NAN_2) may receive the buffered data during the transmission window (TxW) (T2_2~T2_3).

Although only one common resource block (CRB) is shown in FIG. 13, the present invention will not be limited only to this. And, therefore, it should be understood that a plurality of common resource blocks (CRBs) may exist in the second section (T1~T3).

Although it is described that FIG. 13 is operated based on a 2-way scheme for the setup of a data path between the publisher device (NAN_1) and the subscriber device (NAN_2). This specification will not be limited only to the exemplary embodiment, which is described above.

According to another exemplary embodiment, it shall be understood that a 3-way scheme, through which the NAN_2 transmits a data confirm to the NAN_1, after the NAN_2 receives a data response frame, may be used.

Figure 14:
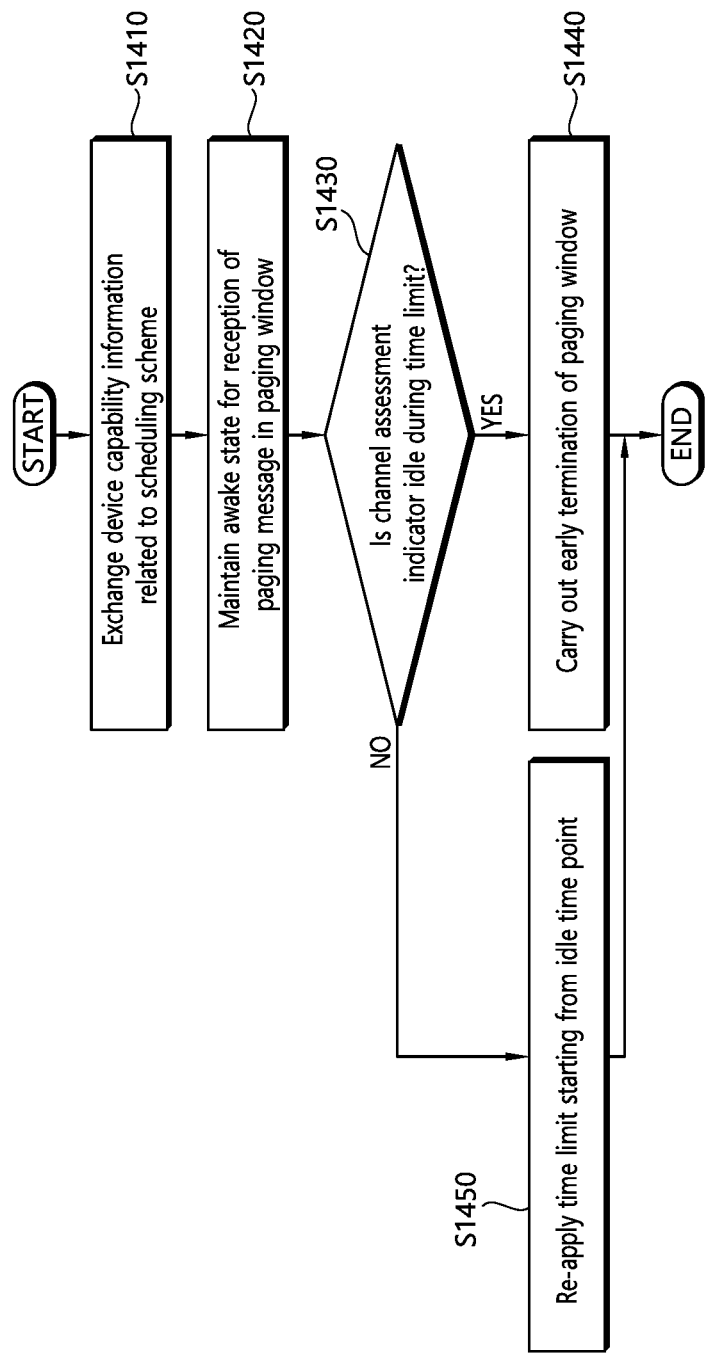
FIG. 14 illustrates a flow chart for a method for a neighbor aware network (NAN) according to an exemplary embodiment of the present invention.

FIG. 14 illustrates a flow chart for a method for a neighbor aware network (NAN) according to an exemplary embodiment of the present invention.

Referring to FIG. 1 to FIG. 14, in step S1410, the publisher device and the subscriber device may exchange device capability information corresponding to the scheduling scheme in a discovery window (DW).

As described above, the publisher device and the subscriber device may exchange a service discovery frame (SDF) in the discovery window (DW). The scheduling scheme for the neighbor aware network (NAN) may include a P-NDL scheme and a S-NDL scheme.

More specifically, a control indicator indicating whether or not the publisher device or the subscriber device can support the P-NDL scheme may include device capability information. Additionally, the device capability information may also be included in a service discovery frame (SDF).

The scheduling scheme for the publisher device and the subscriber device may be selected based on the frame being exchanged in the discovery window (DW). For simplicity in the description of FIG. 14, it will be assumed that the P-NDL scheme is selected as the scheduling scheme for the publisher device and the subscriber device.

In step S1420, when a predetermined offset time is elapsed starting from an end time point of the discovery window, the subscriber device may be activated in order to receive a paging frame, which is received from the publisher device. Similarly, when a predetermined offset time is elapsed from the end time point of the discovery window (DW), the publisher device may be activated in order to transmit the paging frame to the subscriber device.

In this exemplary embodiment, a section during which the subscriber device and the publisher device are activated may be referred to as a paging window. The paging window (PW) may correspond to a time section having a time length, which is predetermined based on the frame that is exchanged in the discovery window (DW).

The subscriber device according to the exemplary embodiment of this specification may initiate its timer operation according to a time limit, which is predetermined based on the start time point of the paging window (PW).

According to the exemplary embodiment of this specification, it will be assumed that the length of the time limit corresponds to a time section that is shorter than the time length of the paging window (PW), which is predetermined based on the frame being exchanged in the discovery window (DW).

The paging window (PW) of FIG. 14 may be understood as the first paging window (T2_1~T2_2) of FIG. 13. It shall be understood that the description provided above with reference to FIG. 13 may replace additional description on the paging frame.

Additionally, the receiving device (or recipient), which is identified in accordance with the list information of the receiving paging frame, may transmit a trigger frame to the publisher device as a response to the receiving paging frame. For example, the trigger frame may correspond to a QoS frame that is irrelevant to the payload.

In step S1430, the subscriber device may determine whether or not a channel assessment indicator, which indicates the channel status of the radio channel, is in an idle state during the time limit.

The channel assessment indicator, which is mentioned in this specification, may be understood as the PHY-CCA. indication primitive, which is described above in FIG. 5. Hereinafter, the channel assessment indicator according to this specification shall not be understood as a concept being limited to a probe response frame, and it shall be understood that the channel assessment indicator may be applied to all frames being transmitted to another physical layer.

The PHY-CCA. indication primitive may correspond to information being internally generated in accordance with a Clear Channel Access (hereinafter referred to as 'CCA') function, which corresponds to one of the functions of the physical layer.

The wireless device according to the exemplary embodiment of this specification may detect (or sense) whether or not a radio channel can be physically used based on the Clear Channel Access (CCA) function. For example, when it is determined that the radio channel can be used in accordance with the Clear Channel Access (CCA) function, a channel assessment indicator indicating the idle state may be received from the physical layer of the device to the MAC layer of the device.

As another example, when it is determined that the radio channel cannot be physically used in accordance with the Clear Channel Access (CCA) function, a channel assessment indicator indicating the busy state may be received from the physical layer of the device to the MAC layer of the device.

The Clear Channel Access (CCA) function, which is mentioned in this specification, may broadly include two methods. Additionally, the Clear Channel Access (CCA) function may be implemented by having two different methods combined in accordance with the structure (or shape) of the physical layer.

As the first method, the Clear Channel Access (CCA) function of the energy detect method may be implemented based on whether or not a Received signal strength indication (RSSI) value of the frame, which is received in the physical layer of the device, exceeds a threshold level (or level limit) (unit dBm).

For example, if the frame that is received in the physical layer exceeds the threshold level, the channel assessment indicator indicating the busy state may be received in the MAC layer of the device from the physical layer of the device.

As another example, if the frame that is received in the physical layer does not exceed the threshold level, the channel assessment indicator indicating the idle state may be received in the MAC layer of the device from the physical layer of the device.

As the second method, the Clear Channel Access (CCA) function of the carrier sense method may be implemented based on length fields of a PLCP preamble and a PLCP header, which are detected in a receiving end of the device, by using a fixed speed (e.g., DSSS PLCP 1 Mbps, DSSS Short Preamble 2 Mbps, and OFDM 6 Mbps).

For example, the device may calculate a duration time of the current frame based on the length fields of the detected PLCP preamble and the PLCP header. Subsequently, information on the calculated duration time of the current frame may be received to the MAC layer of the device from the physical layer of the device.

In case the subscriber device verifies the channel assessment indicator indicating the busy state within the time limit, step S1450 may be performed. A detailed description of step S1450 will be described later on in more detail with reference to FIG. 16 and FIG. 17.

When the subscriber device consistently verifies the channel assessment indicator indicating the busy state during the time limit, step S1440 may be performed.

In step S1440, the subscriber device may carry out an early termination of the paging window (PW). More specifically, the subscriber device may not maintain its awake state in the discovery window (DW) during the predetermined time length of the paging window (PW).

More specifically, the subscriber device may be shifted from the awake state to the sleep state at the end time point of the time limit. Subsequently, according to the exemplary embodiment of this specification, the subscriber device may maintain its sleep state until the next discovery window (DW).

The NAN device, which does not receive the buffered data according to the exemplary embodiment of this specification, does not maintain its awake state during the predetermined time length of the paging window and may carry out an early termination of the paging window (PW). Therefore, according to the exemplary embodiment of this specification, the standby power consumption of the device for receiving the paging frame may be reduced.

Figure 15:
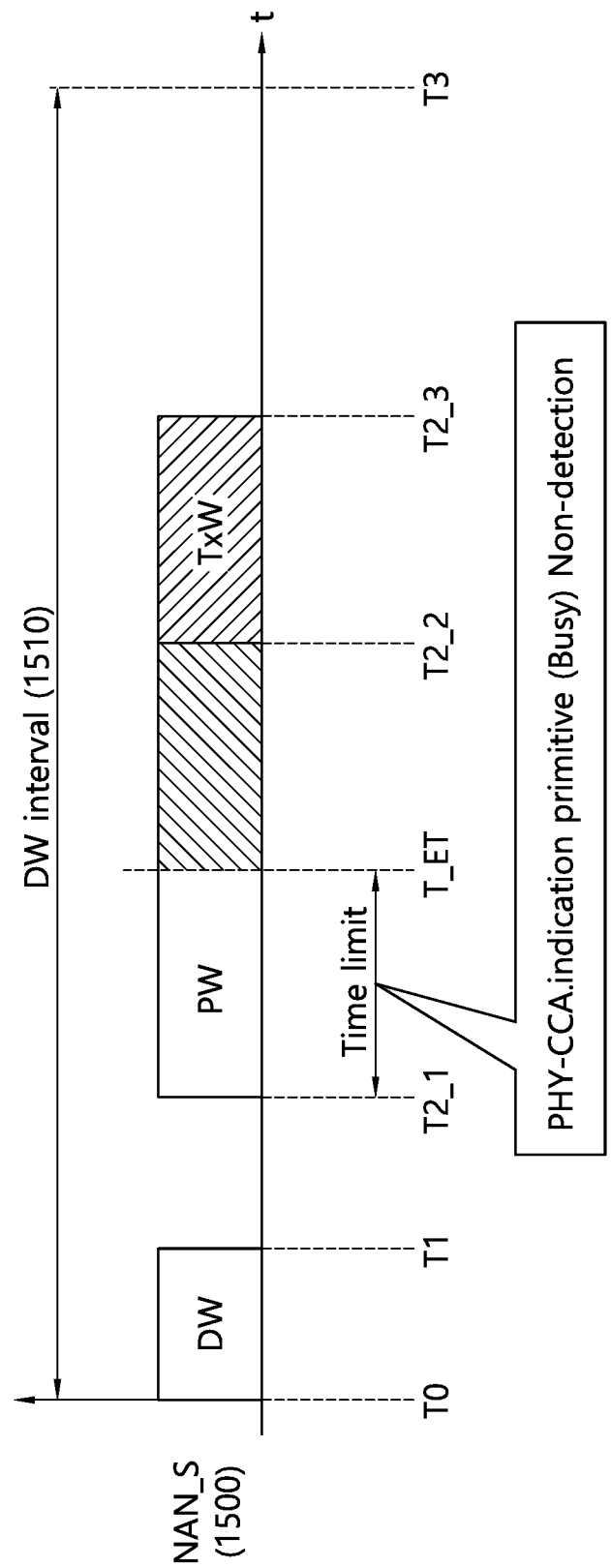
FIG. 15 is a diagram showing an early termination operation being performed in a paging window by a subscriber device according to an exemplary embodiment of the present invention.

FIG. 15 is a diagram showing an early termination operation being performed in a paging window by a subscriber device according to an exemplary embodiment of the present invention.

Referring to FIG. 1 to FIG. 15, a horizontal axis of FIG. 15 may represent a time (t) of the subscriber device (NAN_S) 1500, and a vertical axis may represent a window section corresponding to the subscriber device (NAN_S) 1500.

Referring to FIG. 13 and FIG. 15, a DW interval (T0~T3) 1510 of FIG. 15 may correspond to an added time section of the first section (T0~T1) and the second section (T1~T3) of FIG. 13.

For example, the first section (DW) (T0~T1) of FIG. 15 may correspond to the first section (T0~T1) of FIG. 13. The paging window (PW) (T2_1~T2_2) of FIG. 15 may correspond to the paging window (T2_1~T2_2) of FIG. 13. The transmission window (TxW) (T2_2~T2_3) of FIG. 15 may correspond to the first transmission window (T2_2~T2_3) of FIG. 13.

When the paging scheme is selected as the scheduling scheme for data communication in the discovery window (DW) of FIG. 13, the subscriber device 1500 may shift its operation mode to the sleep state starting from the end time point of the discovery window (DW).

At a time point (T2_1) where a predetermined offset time has elapsed from the end time point (T1) of the discovery window (DW), the subscriber device may shift its operation mode to the awake state in order to receive the paging frame, which is received from the publisher device (not shown).

The subscriber device 1500 according to the exemplary embodiment of this specification may initiate its timer operation in accordance with a predetermined time limit based on a start time point (T2_1) of the paging window (PW).

The subscriber device 1500 according to the exemplary embodiment of this specification may determine whether or not the channel assessment indicator, which indicates a channel state of a radio channel, is in an idle state during the time limit.

As shown in FIG. 15, when a channel assessment indicator being in an idle state is detected during the time limit, the subscriber device 1500 may carry out an early termination of the paging window (PW).

The subscriber device 1500 according to the exemplary embodiment of this specification may not maintain its awake state during a predetermined time length (T2_1~T2_2) of the paging window in the discovery window (DW) (T0~T1).

If a channel assessment indicator being in an idle state is consistently received during the time limit, even if a time point after the time limit (T_ET) is included in the paging window (PW), the subscriber device 1500 according to the exemplary embodiment of this specification may shift its operation mode to the sleep state starting from the time point after the time limit (T_ET).

The subscriber device 1500 according to the exemplary embodiment of this specification may maintain its sleep state starting from the time point after the time limit (T_ET) until a start time point (T3) of the next discovery window.

Figure 16:
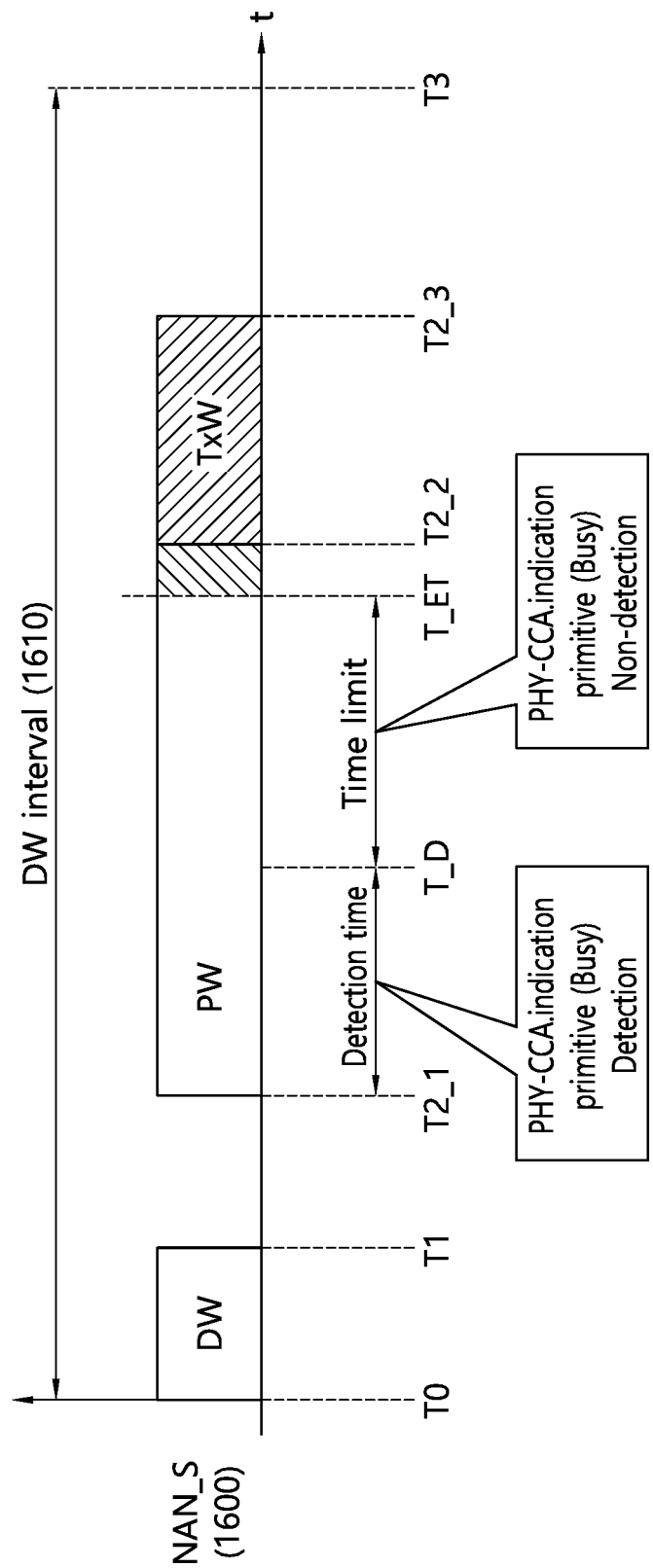
FIG. 16 and FIG. 17 are diagrams showing other operations being performed in a paging window by a subscriber device according to an exemplary embodiment of the present invention.
Figure 17:
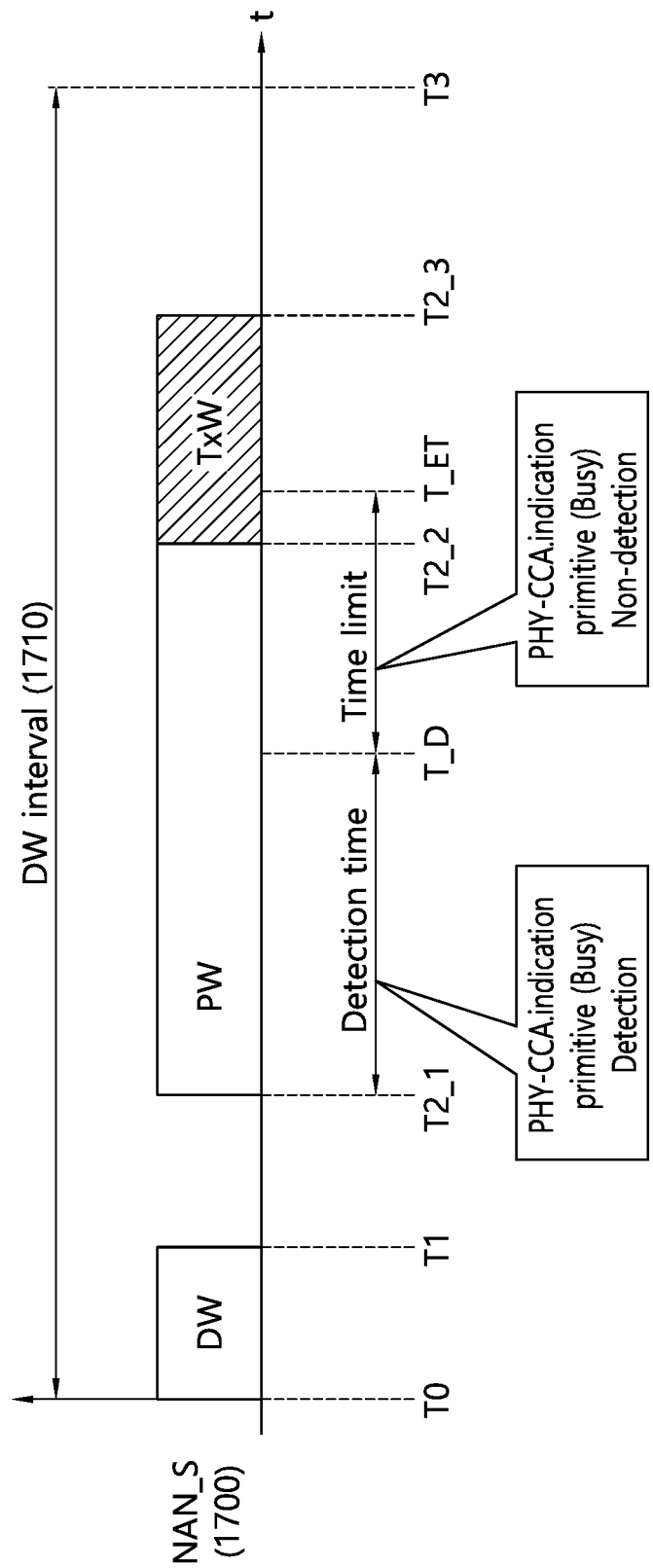

FIG. 16 and FIG. 17 are diagrams showing other operations being performed in a paging window by a subscriber device according to an exemplary embodiment of the present invention. The exemplary embodiments shown in FIG. 16 and FIG. 17 correspond to drawings for specifying step S1450 of FIG. 14.

Referring to FIG. 1 to FIG. 16, a horizontal axis of FIG. 16 may represent a time (t) of the subscriber device (NAN_S) 1600, and a vertical axis may represent a window section corresponding to the subscriber device (NAN_S) 1600.

Additionally, a DW interval (T0~T3) 1610 of FIG. 16 may correspond to an added time section of the first section (T0~T1) and the second section (T1~T3) of FIG. 13. The paging window (PW) (T2_1~T2_2) of FIG. 16 may correspond to the paging window (T2_1~T2_2) of FIG. 13. The transmission window (TxW) (T2_2~T2_3) of FIG. 16 may correspond to the first transmission window (T2_2~T2_3) of FIG. 13.

The subscriber device 1600 of FIG. 16 may detect a channel assessment indicator being in a busy state during a predetermined time period (T2_1~T_D) starting from the start time point (T2_1) of the paging window (PW).

If the channel assessment indicator being in the busy state is detected, the subscriber device 1600 of FIG. 16 may not apply the time limit for the early termination operation of the paging window (PW).

More specifically, the subscriber device 1600 of FIG. 16 may apply the time limit for the early termination operation of the paging window (PW) starting from a time point (T_D) where the channel assessment indicator being in the busy state is not detected (i.e., starting from a time point where the channel assessment indicator being in the idle state is detected).

As shown in FIG. 16, after the time point (T_D) where the channel assessment indicator being in the busy state is not detected, the channel assessment indicator being in the busy state may not be detected consistently during a time limit (T_D~T_ET). In this case, the subscriber device 1600 may be shifted to the sleep state at a time point after the time limit (T_ET) and may carry out an early termination of the paging window (PW).

More specifically, since the subscriber device 1600 of FIG. 16 according to the exemplary embodiment of this specification is not required to maintain its awake state during the remaining section (T_ET~T2_2) of the paging window (PW), the consumption of the standby power of the device for receiving the paging frame may be reduced.

Referring to FIG. 17, a horizontal axis of FIG. 17 may represent a time (t) of the subscriber device (NAN_S) 1700, and a vertical axis may represent a window section corresponding to the subscriber device (NAN_S) 1700.

Additionally, a DW interval (T0~T3) 1710 of FIG. 17 may correspond to an added time section of the first section (T0~T1) and the second section (T1~T3) of FIG. 13. The paging window (PW) (T2_1~T2_2) of FIG. 17 may correspond to the paging window (T2_1~T2_2) of FIG. 13. The transmission window (TxW) (T2_2~T2_3) of FIG. 17 may correspond to the first transmission window (T2_2~T2_3) of FIG. 13.

Unlike FIG. 16, the exemplary embodiment of FIG. 17 is described as a case where the time point after the time limit (T_ET) is positioned at a time point being later than the end time point (T2_2) of the paging window.

The subscriber device 1700 of FIG. 17 may not maintain its awake state until the time point after the time limit (T_ET). More specifically, the subscriber device 1700 may be shifted to a sleep state at the end time point (T2_2) of the paging window.

Figure 18:
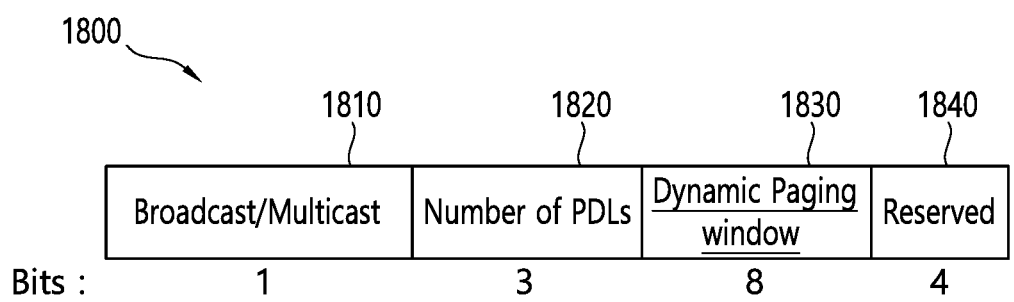
FIG. 18 is a diagram showing the structure of an exemplary field of a paging attribute for the method for a neighbor aware network (NAN) according to another exemplary embodiment of the present invention.

FIG. 18 is a diagram showing the structure of an exemplary field of a paging attribute for the method for a neighbor aware network (NAN) according to another exemplary embodiment of the present invention.

Referring to FIG. 1 to FIG. 18, the paging attribute according to another exemplary embodiment of FIG. 18 may be understood based on the paging attribute of Table 1, which is described with reference to FIG. 13.

The paging attribute according to the other exemplary embodiment of FIG. 18 may include a paging frame. As indicated in Table 1, the paging attribute of FIG. 18 may include an attribute ID field of 1 octet (8 bits), a Length field of 2 octets, an NDL Group ID field of 6 octets, and a Sequence of PDLs field having a variable length.

Unlike the Page Control field of Table, which is presented above, the Page Control field included in the paging attribute of FIG. 18 may be configured of 2 octets. The Page Control field of FIG. 18 may include first to fourth sub-fields 1810 to 1840.

For example, the first sub-field 1810 may include a control indicator indicating whether or not the paging frame that is to be transmitted from the publisher device (not shown) corresponds to a frame according to a broadcast scheme or a multicast scheme.

The second sub-field 1820 may include information on a number of receiving devices (or recipients) that are to receive data in accordance with the paging frame. The third sub-field 1830 may include a dynamic paging window indicator for controlling (or adjusting) a length of a subsequent paging window (PW). And, the fourth sub-field 1840 may correspond to a reserved region.

If the paging window indicator included in the third sub-field 1830 corresponds to a negative indicator for reducing the length of the subsequent paging window, the length of the subsequent paging window may be reduced.

Conversely, if the paging window indicator included in the third sub-field 1830 corresponds to a positive indicator for reducing the length of the subsequent paging window, the length of the subsequent paging window may be increased.

Figure 19:
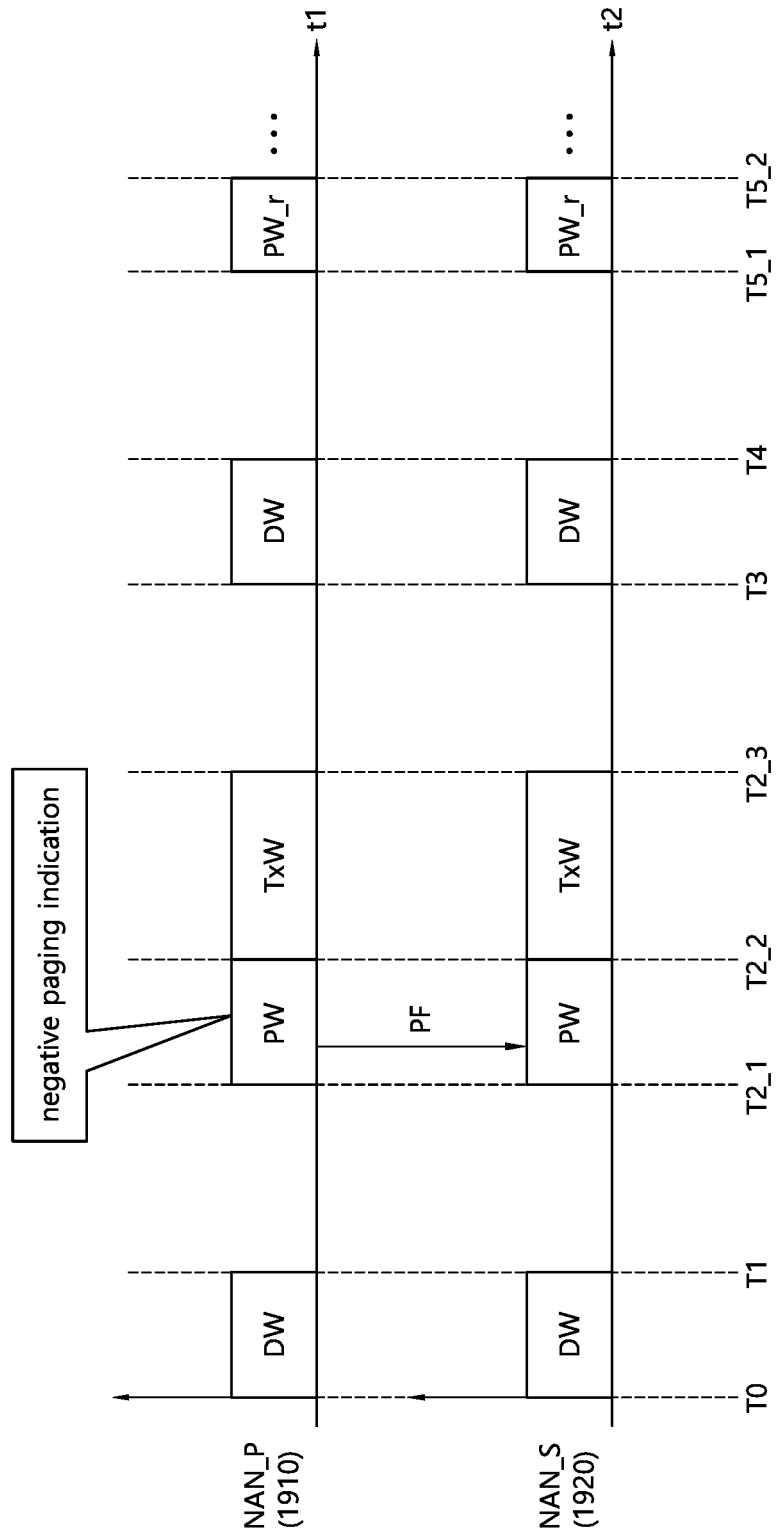
FIG. 19 is a diagram for describing a negative operation for a neighbor aware network (NAN) according to another exemplary embodiment of the present invention.

FIG. 19 is a diagram for describing a negative operation for a neighbor aware network (NAN) according to another exemplary embodiment of the present invention.

Referring to FIG. 1 to FIG. 19, a horizontal axis of the publisher device (NAN_P) 1910 of FIG. 19 may represent a time (t1), and a vertical axis may represent a window section corresponding to the publisher device 1910.

A horizontal axis of the subscriber device (NAN_S) 1920 of may represent a time (t2), and a vertical axis may represent a window section corresponding to the subscriber device 1920.

Additionally, the first discovery window (DW) (T0~T1) of FIG. 19 may correspond to the first section (T0~T1) of FIG. 13. The first paging window (PW) (T2_1~T2_2) may correspond to the paging window (T2_1~T2_2) of FIG. 13. In the discovery window (DW) (T0~T1), the publisher device 1910 and the subscriber device 1920 may exchange a NAN service discovery frame (SDF).

The first transmission window (TxW) (T2_2~T2_3) of FIG. 19 may correspond to the first transmission window (T2_2~T2_3) of FIG. 13.

In this case, a negative indicator may be included in a control field of a paging frame (PF) being transmitted from the first paging window (PW) (T2_1~T2_2) of FIG. 19. The subscriber device 1920 may receive a paging window (T2_1~T2_2) including the negative indicator.

Subsequently, in a subsequent discovery window (DW) (T3~T4), the publisher device 1910 and the subscriber device 1920 may exchange a NAN service discovery frame (SDF).

Subsequently, a second paging window (PW_r) (T5_1~T5_2) according to another exemplary embodiment of this specification has a time length that is more reduced than the paging window in accordance with the paging frame (PF) being transmitted from the first paging window (PW).

A section during which the NAN device maintains its awake state may be reduced in accordance with the reduced paging window section. Accordingly, the standby power being consumed by the NAN device may be reduced.

Figure 20:
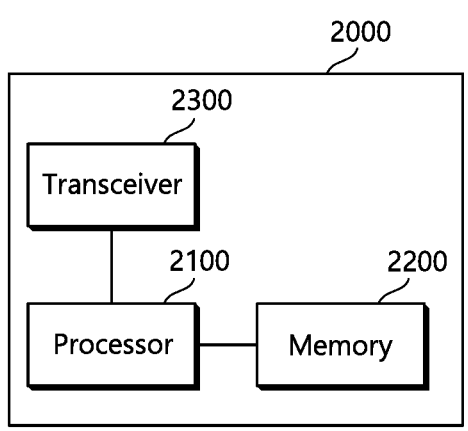
FIG. 20 is an exemplary block diagram of a wireless device to which an exemplary embodiment of the present invention can be applied.

FIG. 20 is an exemplary block diagram of a wireless device to which an exemplary embodiment of the present invention can be applied.

A wireless device 2000 may include a processor 2100, a memory 2200, and a transceiver 2300. The wireless device 2000 may correspond to the above-described NAN device according to an exemplary embodiment of this specification.

The processor 2100 implements the function, procedure, and/or method that is/are proposed in this specification. An operation of the wireless device 2000 according to the above-described exemplary embodiment of this specification may be implemented by the processor 2100.

The memory 2200 may be connected to the processor 2100, thereby being capable of storing instructions for implementing the operation of the processor 2100. The processor 2100 may include an application-specific integrated circuit (ASIC), another chipset, a logic circuit, and/or a data processor. The memory 2200 may include a read-only memory (ROM), a random access memory (RAM), a flash memory, a memory card, a storage medium, and/or other storage devices. An RF unit may include a baseband circuit for processing radio signals.

The transceiver 2300 may be connected to the processor 2100, thereby being capable of transmitting and/or receiving radio signals. When the exemplary embodiment of this specification is implemented as software, the above-described scheme may be implemented by a module (procedure, function, and so on) in order to perform the above-described functions. The module may be stored in the memory and may be implemented by the processor. The memory may be located inside or outside the processor and may be connected to the processor through various well-known means.

Although an embodiment of the invention has been described in detail in the present specification, various modifications are possible without departing from the scope of the present specification. Therefore, the scope of the present specification should not be construed as being limited to the aforementioned embodiment but should be defined by not only claims of the invention described below but also equivalents to the claims.

What is claimed is:
1. A method for a neighbor aware network (NAN), the method comprising:
exchanging, by a first device, device capability information related to a scheduling scheme for data communication with a second device in a Discovery Window;
when a paging scheme is selected as the scheduling scheme, maintaining, by the first device, an awake state in a Paging Window in order to receive a paging message including identification information indicating a recipient of traffic data that are to be received from the second device; and
when a channel assessment indicator indicating a channel state of a radio channel in accordance with a signal being received in a physical layer of the first device is idle during a predetermined time limit, carrying out, by the first device, an early termination of the paging window and shifting from the awake state to a sleep state.

2. The method of claim 1, wherein the paging window is activated when an offset time being predetermined in the discovery window is elapsed.

3. The method of claim 1, wherein the identification information includes MAC address information of the recipient.

4. The method of claim 1, further comprising:
if the channel assessment indicator is busy before the time limit has elapsed, applying, by the first device, the time limit from a time point at which the channel assessment indicator is idle.

5. The method of claim 4, further comprising:
when an end time point of the time limit exceeds an end time point of the paging window, shifting, by the first device, to the sleep state at the end time point of the paging window.

6. The method of claim 1, further comprising:
maintaining, by the first device, the sleep state until a next paging window (PW).

7. The method of claim 6, further comprising:
shifting, by the first device, to the awake state at the beginning of the next PW.

8. The method of claim 1, wherein the device capability information is included in a Service Discovery Frame.

9. A wireless device using a method for a neighbor aware network (NAN), comprising:
  a transceiver for transmitting and receiving radio signals; and
  a processor being operatively connected to the transceiver,
  wherein the processor is configured:
  to exchange device capability information related to a scheduling scheme for data communication with a second device in a Discovery Window,
  to maintain an awake state in a Paging Window in order to receive a paging message including identification information indicating a recipient of traffic data that are to be received from the second device, when a paging scheme is selected as the scheduling scheme, and
  to carry out an early termination of the paging window and shifting from the awake state to a sleep state, when a channel assessment indicator indicating a channel state of a radio channel in accordance with a signal being received in a physical layer of the first device is idle during a predetermined time limit.

10. The method of claim 9, wherein, if the channel assessment indicator is busy before the time limit has elapsed, the time limit is applied from a time point at which the channel assessment indicator is idle.

* * * * *